United States Patent
Maloney

(10) Patent No.: US 11,512,721 B2
(45) Date of Patent: Nov. 29, 2022

(54) GRAVITY-ORIENTATION COUPLER

(71) Applicant: Ewing-Foley, Inc., Cupertino, CA (US)

(72) Inventor: Michael J. Maloney, Doylestown, PA (US)

(73) Assignee: Ewing-Foley, INC, Cupertino, CA (US)

( * ) Notice: Subject to any disclaimer, the term of this patent is extended or adjusted under 35 U.S.C. 154(b) by 0 days.

(21) Appl. No.: 17/665,261

(22) Filed: Feb. 4, 2022

(65) Prior Publication Data

US 2022/0252094 A1 Aug. 11, 2022

Related U.S. Application Data

(60) Provisional application No. 63/146,127, filed on Feb. 5, 2021.

(51) Int. Cl.
| | |
|---|---|
| *F16B 2/16* | (2006.01) |
| *F16B 1/04* | (2006.01) |
| *F16B 5/00* | (2006.01) |
| *G06F 1/16* | (2006.01) |
| *F16B 1/00* | (2006.01) |

(52) U.S. Cl.
CPC .............. *F16B 1/04* (2013.01); *F16B 5/0084* (2013.01); *F16B 2001/0035* (2013.01); *G06F 1/1626* (2013.01)

(58) Field of Classification Search
CPC .. F16B 1/04; F16B 5/0084; F16B 2001/0035; F16B 2/16
See application file for complete search history.

(56) References Cited

U.S. PATENT DOCUMENTS

| | | | | |
|---|---|---|---|---|
| 2,972,833 | A * | 2/1961 | Pascal ................. | A63H 33/062 59/80 |
| 4,278,224 | A * | 7/1981 | Arakawa .............. | A47B 43/006 248/246 |
| 4,947,527 | A * | 8/1990 | Hennig ................ | A63H 17/264 446/120 |
| 5,170,982 | A | 12/1992 | Schultheis et al. | |
| 5,645,464 | A * | 7/1997 | Chen ..................... | A63H 33/10 446/120 |

(Continued)

FOREIGN PATENT DOCUMENTS

| | | |
|---|---|---|
| DE | 102017116267 A1 | 1/2018 |
| GB | 2337288 A | 11/1999 |

OTHER PUBLICATIONS

International Search Report, PCT/US2022/015389, dated Apr. 27, 2022, 2 pgs.

*Primary Examiner* — Daniel J Wiley
(74) *Attorney, Agent, or Firm* — Ip Works, PLLC; Bradley M. Brown

(57) ABSTRACT

A gravity-orientation coupler is shown and described. The gravity-orientation coupler includes a first coupler half and a second coupler half, wherein the coupler halves are shaped to fit flush together. Each coupler half is comprised of a tongue having a ball chamber which is located within one end of the tongue. The ball chamber movably houses a ball. The ball chamber has an opening located at one side. The tongue of one coupler half is configured to align with and fit flush against the other coupler half. The ball and ball chamber are configured such that when the coupler halves are fitted together the ball in at least one of the ball chambers will apply pressure to the respective tongue securing it therein.

19 Claims, 19 Drawing Sheets

(56) References Cited

U.S. PATENT DOCUMENTS

| | | | | |
|---|---|---|---|---|
| 6,109,818 A | * | 8/2000 | Engel | F16G 11/00 403/322.2 |
| 7,040,834 B2 | * | 5/2006 | Nardi | A47C 1/143 403/375 |
| 10,881,012 B1 | | 12/2020 | Wu et al. | |

* cited by examiner

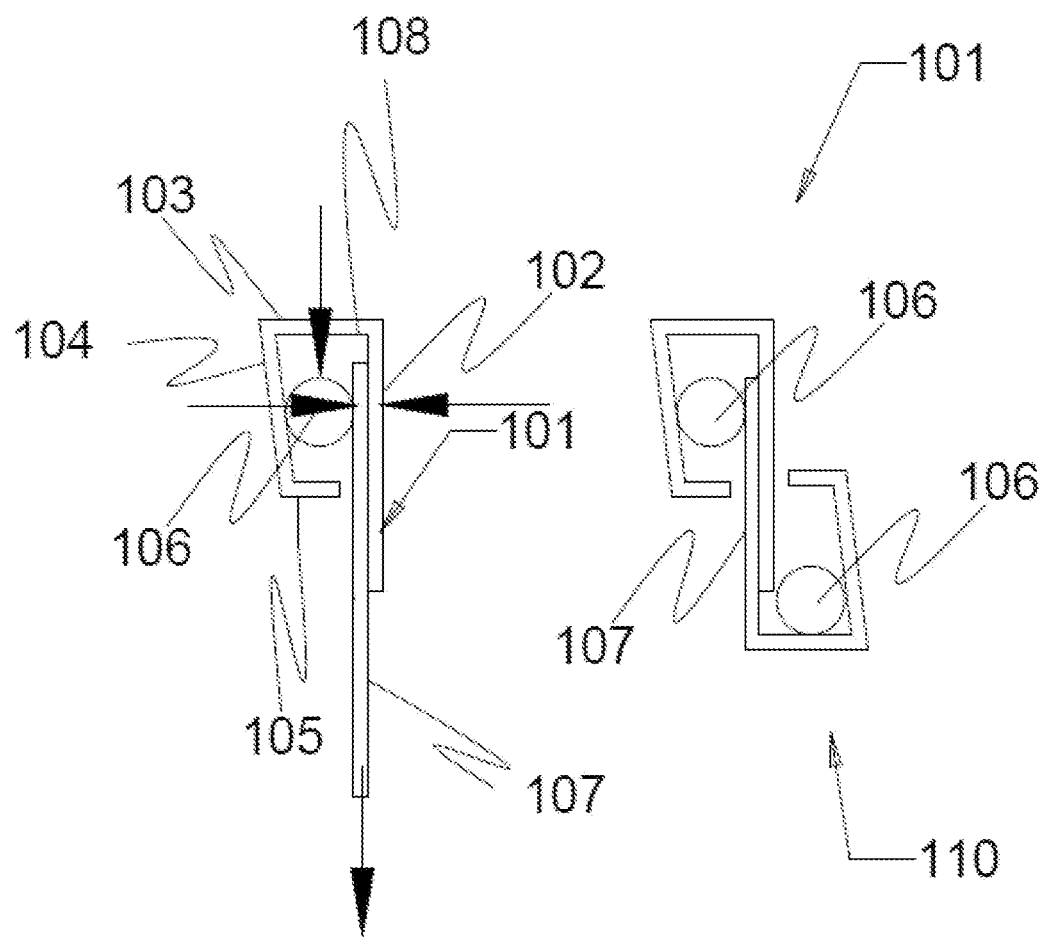
FIG. 1A
Prior Art
FIG. 1B
Prior Art
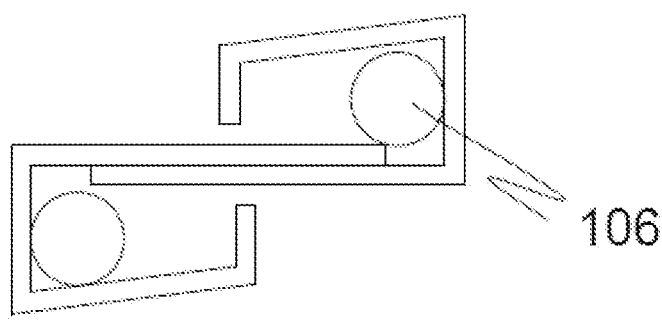
FIG. 1C
Prior Art

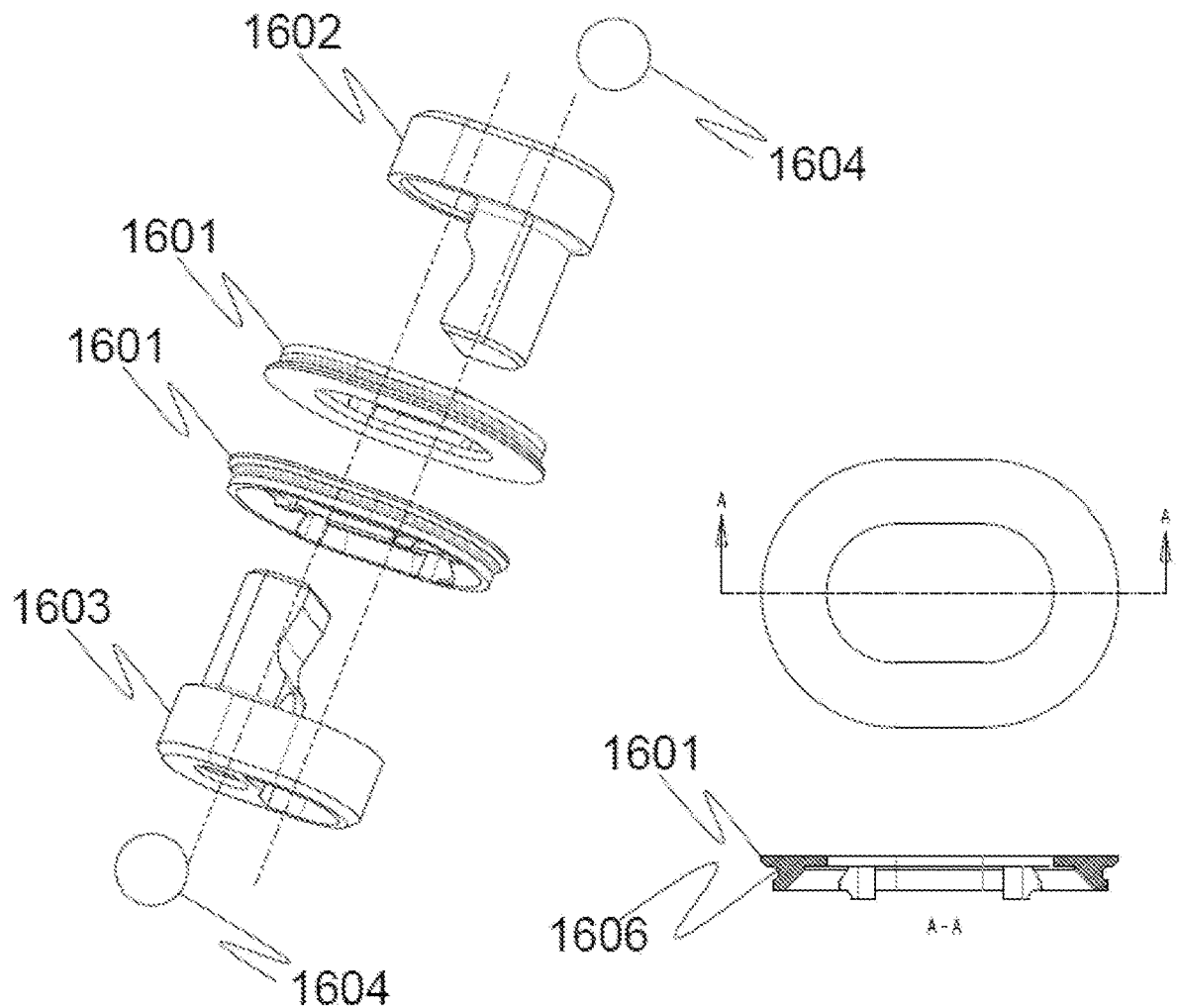
FIG.16A
FIG. 16B
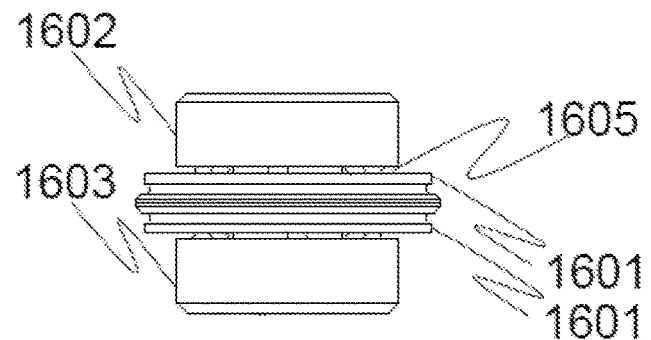
FIG. 16C

GRAVITY-ORIENTATION COUPLER

CROSS REFERENCE TO RELATED APPLICATIONS

This application claims the benefit of U.S. Provisional Application No. 63/146,127 filed on Feb. 5, 2021. The above identified patent application is herein incorporated by reference in its entirety to provide continuity of disclosure.

FIELD OF THE INVENTION

The described embodiments relate to mechanical fasteners. Specifically, the embodiments relate to utilizing a mechanical fastener to secure components of any device or device housing, in a manner which is not visible or detectable from the outside of the device. Moreover, the embodiments describe a method of quick secure assembly, and easy disassembly provided instructions as to how to orient the device, and where to apply an external tool if desired. In summary, the current embodiments help create easily serviceable devices while still providing aesthetically pleasing, penetration reduced enclosures or assemblies.

BACKGROUND OF THE INVENTION

Electronic devices, such as mobile phones, laptop computers, tablet computers, or displays, typically include a housing which enrobes numerous components including printed circuit boards, integrated circuit packages, batteries, solid state drives, mobile displays, and the like. Within the housing there can also be numerous structural components that are secured by various means such as screws, clinching fasteners, and adhesives. While adhesives can hide the means of assembly, they create non-serviceable products. Screws can be hidden by means of designing the structures such that they can be concealed with components such as rubbing feet as is done with many laptops, or edgewise behind cosmetic bendable backbones or hinges on some detachable tablet type computers. Designing with the premise, of where to install the screws for their concealment, greatly restricts an engineer's or designer's potential form factors for the design of new devices.

A class of hidden attachment devices that is employed currently to attach security devices to clothing garments in many department stores operates by inserting a pin into a gripper device which grips the pin, with no visible means of detachment. Given their hidden nature, disassembly of such enclosures can be impossible as the fasteners cannot be directly actuated by direct contact with a disassembly tool. A magnet is used to disassemble this sort of device. While this can be used as a hidden fastener within an enclosure it requires knowledge of the locations of the devices within an enclosure for disassembly, complicating serviceability. These devices are assemblies of many parts. As such, they are difficult to minimize in stature and assemble on a large basis, making them ineffective for mass production of many devices. Current technologies for hidden fasteners do not meet all of the necessary requirements for the design, construction, and serviceability of many devices, requiring a cosmetic appearance that is expected by most consumers. There is therefore a need in the art for a fastener that can be hidden when installed with no external evidence of the fastener, create a secure attachment, and be detached and reassembled easily for servicing with little or no tools.

SUMMARY OF THE INVENTION

The present invention provides a gravity-orientation coupler wherein the same can be utilized for securing electronic devices together without the need for additional exterior fastener. The gravity-oriented coupler is comprised of a first coupler half and a second coupler half, wherein the coupler halves are shaped to fit flush together. Each coupler half is comprised of a tongue having a ball chamber which is located within one end of the tongue. The ball chamber movably houses a ball. The ball chamber has an opening located at one side. The tongue of one coupler half is configured to align with and fit flush against the other coupler half. The ball and ball chamber are configured such that when the coupler halves are fitted together the ball in at least one of the ball chambers will apply pressure to the respective tongue securing it therein.

Another object of the gravity-oriented coupler is to include a housing holding each coupler half.

Another object of the gravity-oriented coupler is to include a tongue chamber adjacent to the opening of each ball chamber. Wherein the tongue chamber is configured to accept the tongue of the opposing coupler half. Further, the ball is partially able to protrude from the opening on the chamber to apply pressure to the opposite tongue.

Another object of the gravity-oriented coupler is to include at least one flat surface on each tongue, wherein the ball will contact that flat surface.

Another object of the gravity-oriented coupler is to include an angle along each tongue. Wherein the angle is obtuse and faces toward the ball chamber of the opposite coupler half.

Another object of the gravity-oriented coupler is to include a ball which is made of a ferromagnetic material.

Another object of the gravity-oriented coupler is that once the coupler halves are secured together the coupler will only release when the coupler is positioned at a predetermined angle.

Another object of the gravity-oriented coupler is to include at least one gasket placed between the housings of each coupler half.

Another object of the gravity-oriented coupler is to include a device, wherein the device is comprised of at least two halves. At least one coupler half is secured to each half of the device. When the device halves are placed together each of the at least one coupler halves will align securing the device halves together.

Another object of the gravity-oriented coupler is to include a displacer securing each coupler half, wherein the displacer has at least one undercut. The displacer is pressed into a malleable material of the device forcing the malleable material into the undercut securing the coupler half to the device.

Another object of the gravity-oriented coupler is to include a protrusion which is located at one end of each tongue.

Another object of the gravity-oriented coupler is to include a channel in each housing that will correspond to the opposite protrusion. Wherein when the coupler halves are secured together the protrusion will fit within the channel.

Another object of the gravity-oriented coupler is a gravity-oriented coupler consisting of a first coupler half and a second coupler half, wherein the coupler halves are shaped to fit flush together. Each coupler half is comprised of a tongue. A ball chamber is located within each coupler half, wherein the ball chamber movably houses a ball. The ball chamber has an opening located at one side. The tongue of one coupler is configured to align with the opening of the opposite ball chamber. The chamber is configured such that when the coupler halves are secured together the ball in at least one of the chambers will apply pressure to the respective tongue securing it together.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1A shows a side view of a prior art securement device.

FIG. 1B shows a side view of a prior art securement device.

FIG. 1C shows a side view of a prior art securement device.

FIG. 16A shows an exploded view of an embodiment of the gravity-orientation coupler.

FIG. 16B shows a side view of an embodiment of a floating displacer used with the gravity-orientation coupler.

FIG. 16C shows a side view of an embodiment the gravity-orientation coupler secured together.

DETAILED DESCRIPTION OF THE INVENTION

Figure 2A:
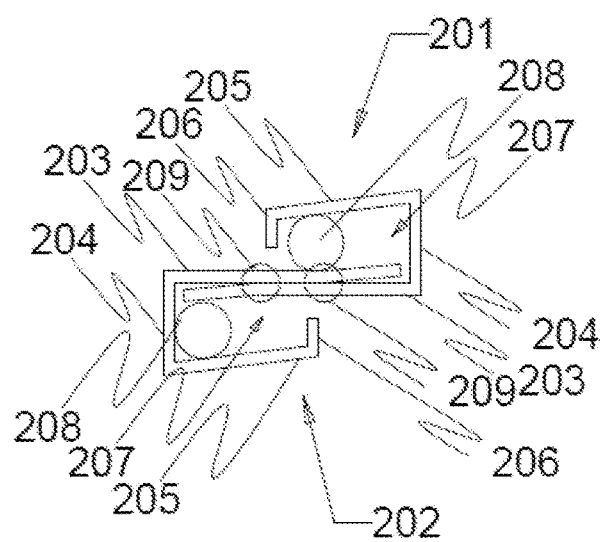
FIG. 2A shows a side view of an embodiment of the gravity-orientation coupler.

Reference is made herein to the attached drawings. Like reference numerals are used throughout the drawings to depict like or similar elements of the gravity-orientation coupler. For the purposes of presenting a brief and clear description of the present invention, a preferred embodiment will be discussed as used for the gravity-orientation coupler. The figures are intended for representative purposes only and should not be considered to be limiting in any respect.

Referring now to FIG. 1A-FIG. 1B there is shown several side views of prior art. The prior art includes one housing 101. The housing 101 includes a first wall 102 which is attached to a base 103 at one end. A second wall 104 is attached to the base 103 opposite the first wall 102. In the shown embodiment each wall 102, 104 is attached to the base 103 at an end of the wall 102, 104. In one embodiment the second wall 104 angles toward the first wall 102.

A topper 105 is secured to the end of the second wall 104 opposite the attachment to the base 103. The topper 105 terminates prior to first wall 102 creating a gap. The configuration of the first wall 102, the base 103, the second wall 104, and the topper 105 creates a chamber 108 therein. A ball 106 is located within the chamber 108. A tongue 107 is configured to enter into the chamber 108 through the gap created by the first wall 102 and the topper 105.

The second wall 104 and the tongue 107 will wedge the ball 106 between the angles surface of the second wall 104 and the tongue 107. Friction between the ball 106 and the tongue 107 as well as the second wall 104 try to rotate the ball clockwise, increasing the grip force. Because of the friction, the tongue 107 is only released when the coupler is turned to an orientation that allows the ball 106 to fall out of the engagement position, and pull force, is reversed. This is an effective way to hold the tongue 107 in position when the coupler is rigidly fixed to a preferred mating component.

In another embodiment the tongue 107 is actually a first wall of a second housing 110. In one embodiment the second housing 110 is constructed identical to the first housing 101. When either one of the housings are rotated one hundred eighty (180) degrees the housing 101, 110 will fit together. When the housings 101, 110 are located in all but a select few positions the housings 101, 110 will not separate.

It is shown that two of the same couplers can be attached in the same way. In this orientation the coupler is secured by the top coupler, while the bottom coupler is disengaged. It is also shown that if the pair of couplers is rotated by one hundred eighty (180) degrees in the same plane, that the ball 106 in the top coupler will fall into the engagement position by gravity alone, and both balls 106 will be engaging each coupler. Now if the pull force is reversed, the bottom ball 106 will release the top coupler, but the ball 106 in top coupler will only seat further as the reversed load is applied and released. As such this pair cannot be separated in this orientation. However, the location of the top ball 106 in FIG. 1C is indeterminate since it is now horizontal. The bottom ball in FIG. 1C is still rolled into its disengaged position. In the state shown the couplers could easily be separated. This will cause many issues as any time a coupler is set in a horizontal position there is a possibility of separation.

Figure 2B:
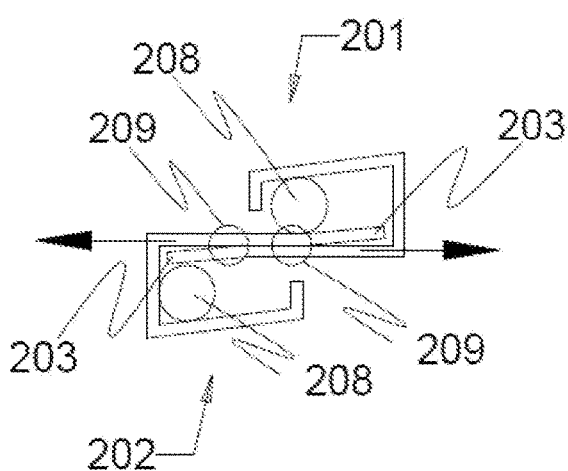
FIG. 2B shows a side view of an embodiment of the gravity-orientation coupler including force arrows.
Figure 2C:
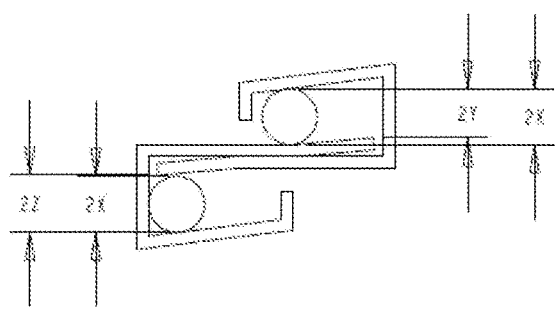
FIG. 2C shows a side view of an embodiment of the gravity-orientation coupler.

Referring now to FIG. 2A-FIG. 2C there is shown various views of a basic embodiment of the gravity-orientation coupler. In this embodiment the coupler includes a first housing 201 and a second housing 202. Each housing 201, 202 is comprised of a first wall 203 which is attached to a base 204 at one end. A second wall 205 is attached to the base 204 opposite the first wall 203. In the shown embodiment each wall 203, 205 is attached to the base 204 at an end of the wall 203, 205. In one embodiment the second wall 205 angles toward the first wall 203.

A topper 206 is secured to the end of the second wall 205 opposite the attachment to the base 204. The topper 206 terminates prior to first wall 203 creating a gap. The configuration of the first wall 203, the base 204, the second wall 205, and the topper 206 creates a chamber 207 therein. A ball 208 is located within the chamber 207. Every material has an elastic zone. An elastic zone is the amount of force that a material will accept to bend, but not break, returning to the original shape or size. Here the balls 208 all have a designated elastic zone. When the coupler halves are placed together, and the balls 208 are locked into place the elastic zone of each ball 208 will allow for the balls 208 to flex. This flex will allow the balls 208 to compress when clamped then to apply pressure to the coupler halves as the force created by the elasticity of the balls 208 acts to return the balls 208 to their original size and shape. While this theory is described in reference to FIG. 2A-FIG. 2C it is to be part of this disclosure that it may apply to all balls and couplers throughout the disclosure.

The first sidewall 203 of each coupler half 201, 202 functions as a tongue and is configured to enter into the opposite chamber 207 through the gap created by the first wall 203 and the topper 206. In this embodiment the first sidewalls 203 include an angle 209 therein. The angle 209 will move the first wall 203 away from the opposing first wall 203 and into the chamber 207. One purpose for this angle 209 is to cause interference when attempted separation occurs. As the coupler halves 201, 202 are pulled away from each other the angled first sidewall 203 will add additional pressure to the ball 208 causing an increased friction force and thus a better lock.

Further, adding an angle 209 to the first sidewall 203 eliminates the indeterminate condition. In this plane it can be seen that any rotation of the coupled pair will result in an engagement of the ball in at least one coupler, disallowing any disassembly in this plane. With the addition of the angled first wall 203 of each coupler half 201, 203, positive engagement between the top ball 208 and the top coupler is achieved. FIG. 2B illustrates that in addition to the grip force that is created by the angled surface and friction with the ball 208 and sidewall 203 surfaces, the angled sidewall 203, creates a narrower channel, disallowing the ball to exit, making further tightening the only option if separation is attempted.

In the embodiment of FIG. 2C there is shown various measurement distances. In this embodiment the ball diameter 2X, is greater than dimension 2Y. At the same time, we can also see that in this configuration the ball diameter 2X is less than dimension 2Z, creating a situation where the bottom ball does not grip.

Figures 3A, 3B, 3C:
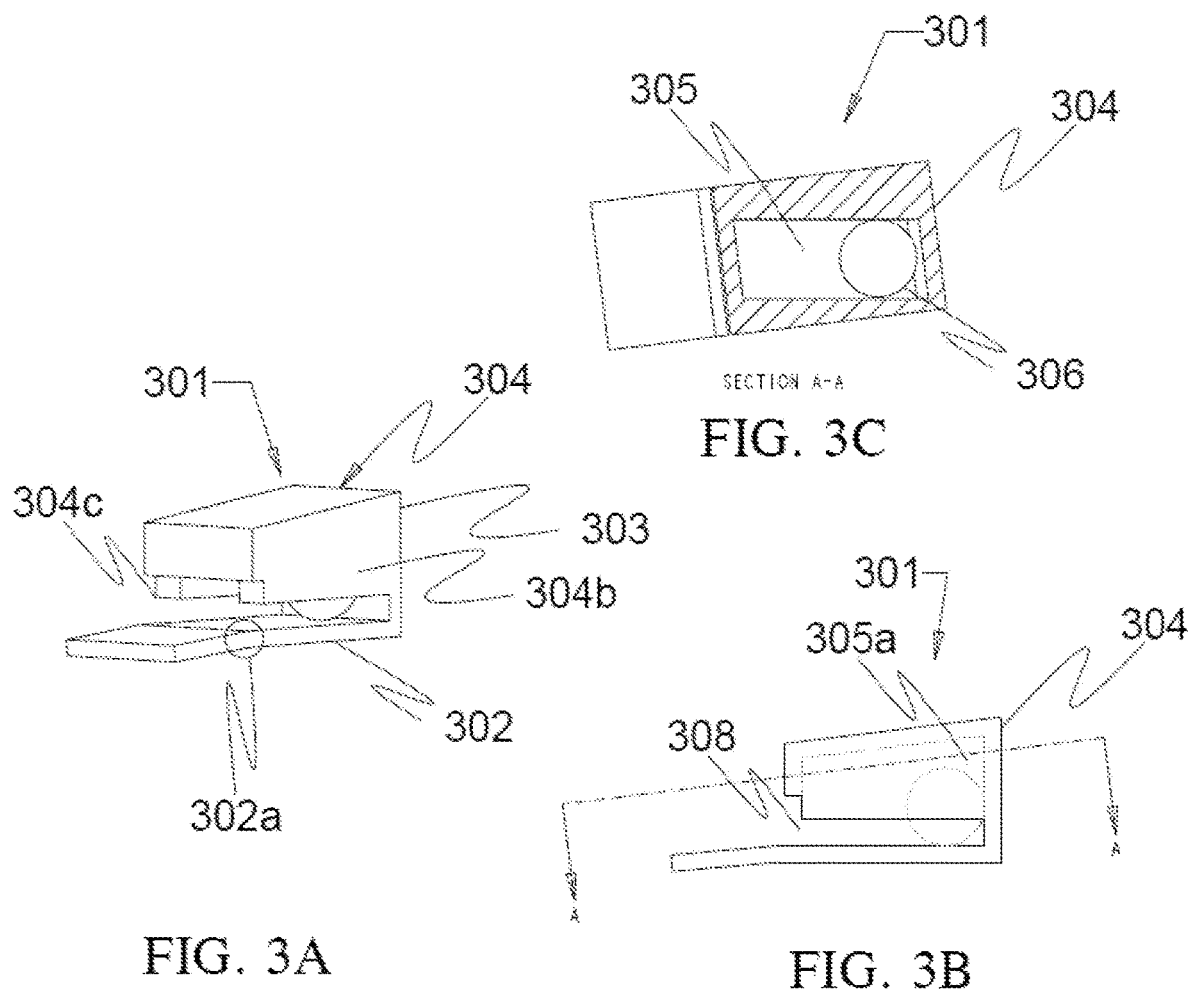
FIG. 3A shows a perspective view of an embodiment of the gravity-orientation coupler.
FIG. 3B shows a side view of an embodiment of the gravity-orientation coupler.
FIG. 3C shows a cross sectional view of an embodiment of the gravity-orientation coupler.

Referring now to FIG. 3A-FIG. 3B there is shown various views of an embodiment of the gravity-orientation coupler. Shown is one part of the gravity-oriented coupler. In one embodiment the gravity-oriented coupler is comprised of a first coupler half 301. The coupler half 301 is comprised of a first wall 302. In one embodiment the first includes an angle 302a. The angle 302a will allow for a more secure coupling as described below. The first wall is connected at one end to a rear surface 303. In one embodiment the rear surface 303 is secured to the first wall 302 at approximately a ninety (90) degree angle.

A main housing 304 is secured to a second end of the rear surface 303. The main housing 304 is comprised of a plurality of walls 304b, 304c. The plurality of walls 304b, 304c, create and inner chamber 305. In one embodiment the chamber is larger 305a at one end. A ball 306 is movably placed within the chamber 305.

In various embodiments a tongue is inserted into the opening 308 as described below. In another embodiment a second housing similar to the first, as described below is used and inserted into the opening 308.

Figure 4A:
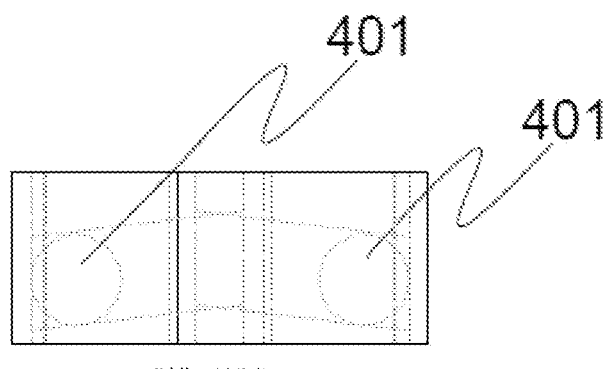
FIG. 4A shows a top-down view of an embodiment of the gravity-orientation coupler.
Figure 4B:
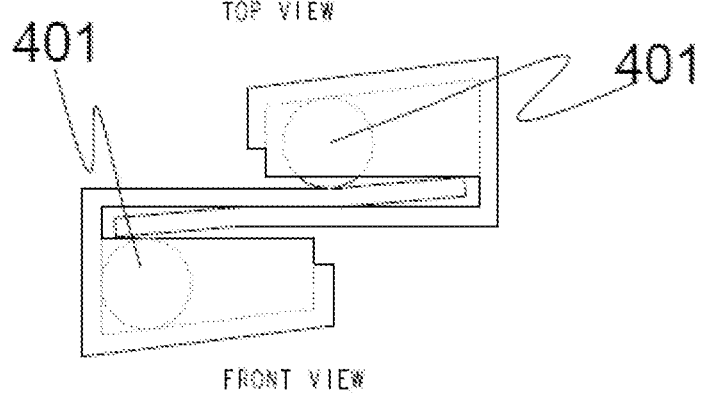
FIG. 4B shows a side view of an embodiment of the gravity-orientation coupler.
Figure 4C:
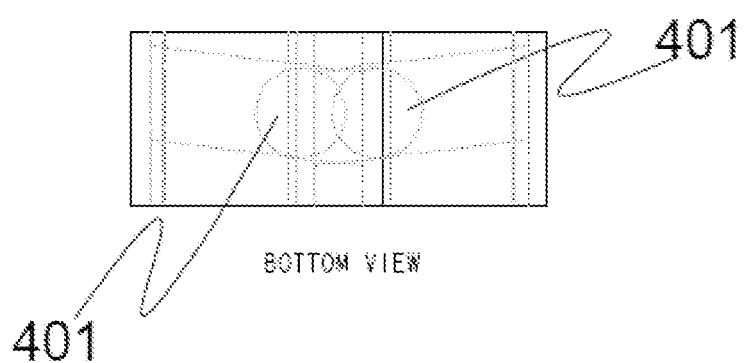
FIG. 4C shows a bottom-up view of an embodiment of the gravity-orientation coupler.

Referring now to FIG. 4A-FIG. 4C there is shown various views of an embodiment of the gravity-orientation coupler. The balls 401 in each view, shown as hidden lines, are not proper projections, but are shown where the ball 401 will roll to, given the orientation of the pair of gravity-oriented coupler halves. The ramped sides of each coupler are shown as dotted lines. An interesting feature added by the ramped walls is that when two couplers are secured together, the horizontal orientations of the top view and bottom view cause the unique conditions of fully engaged balls 401 per the bottom view, and fully disengaged balls 401 per the top view. It is this aspect that permits a coupled pair to be separated by the action and direction of gravity, the application of a reverse pull force, and the orientation of the pair to allow the balls 401 to roll apart as shown by the top view.

Figure 5:
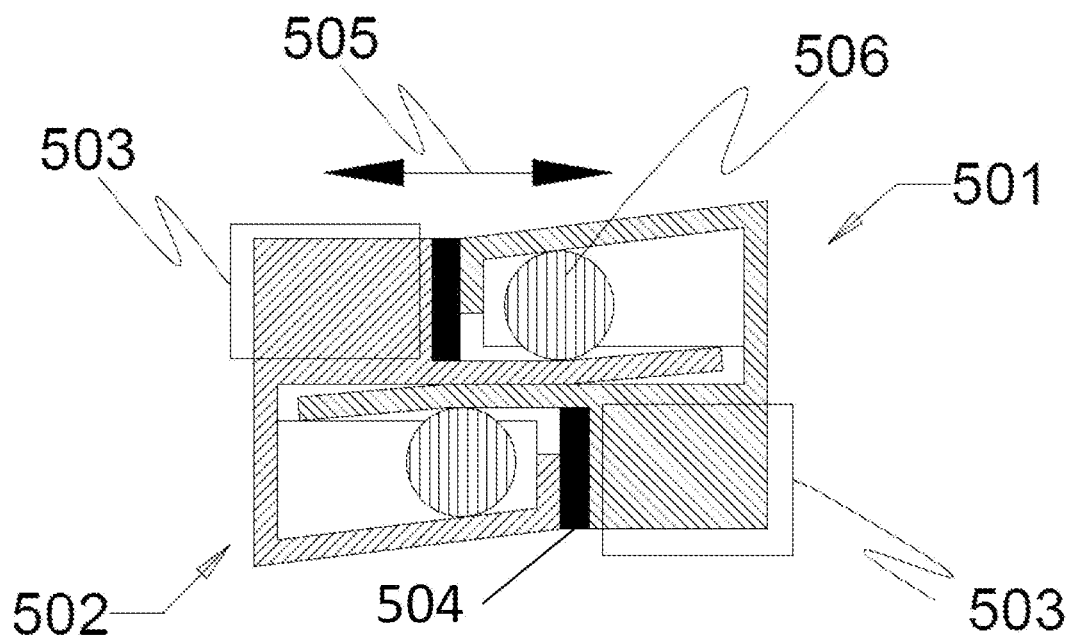
FIG. 5 shows a cross sectional view of an embodiment of the gravity-orientation coupler.
Figure 6A:
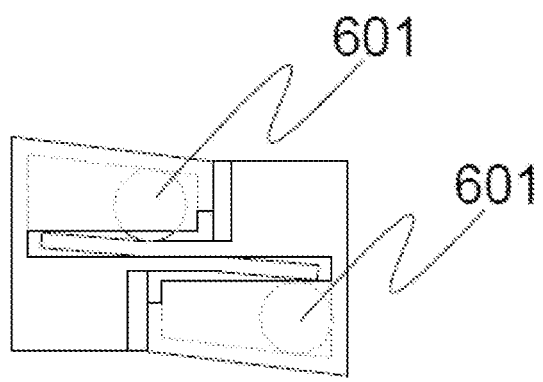
FIG. 6A shows a side view of an embodiment of the gravity-orientation coupler.
Figure 6B:
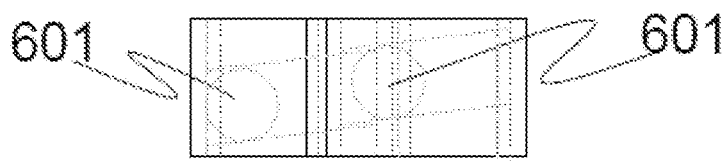
FIG. 6B shows a top-down view of an embodiment of the gravity-orientation coupler.
Figure 6C:
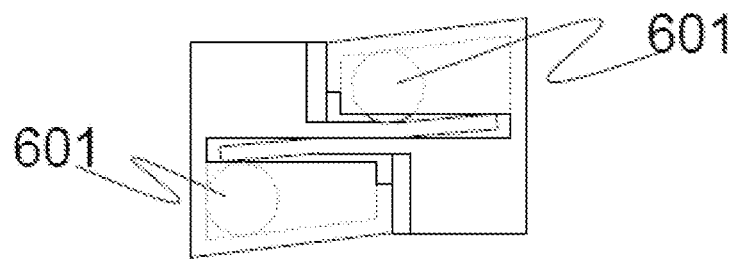
FIG. 6C shows a side view of an embodiment of the gravity-orientation coupler.
Figure 6D:
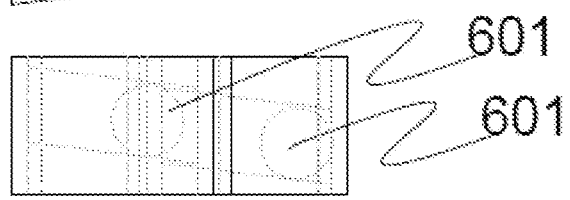
FIG. 6D shows a bottom-up view of an embodiment of the gravity-orientation coupler.

Referring now to FIG. 5 there is shown a cross sectional view of an embodiment of the gravity-orientation coupler. By adding some additional body material 503, and a compressible element 504 between the coupled halves 501, 502, such that it provides a biasing force 505 in the pull apart direction, the balls 506 remain tightly engaged until the need to separate. This sets a minimum and deliberate reversed, disengage force, that needs to be overcome in order to release wedged balls 506 from their engaged positions. This deliberate disengage force also presumes that the deliberate disengage orientation is also set first by a person seeking to disassemble a device.

Referring now to FIG. 6A-FIG. 6D, there is shown various views of an embodiment of the gravity-orientation coupler. While the views shown are projections, the ball 601 positions shown within them are not. As in FIG. 4A-FIG. 4C, the ball 601 positions represent the locations to which the balls 601 will roll in that given orientation. In all of the views in FIG. 6A-FIG. 6D, only one ball 601 engages, disallowing the pair to be separated in any orientation once assembled. This configuration is a lock. This locking version is composed of two different coupler halves, a left and a right. To create the left and right versions, it is only necessary to reverse the ball 601 channel angle described in FIG. 9 and FIG. 10, for one of the coupler halves only.

To unlock the coupler of FIG. 6A-FIG. 6D, the device in which the coupler is installed into must be oriented in the release position. For the locking coupler, the ball 601 that is still engaged must be moved by a magnet. As such the ball 601 must be ferromagnetic. To avoid unwanted binding, the disengaged ball 601 is made of a hard material that is not affected by a magnet. The loose ball 601 and the engaged ball 601 will be known since the device in which the coupler is used will be designed with a specific orientation for disassembly in mind. Once oriented, a cover of the assembly can be pressed on to decouple the fasteners. If only one of the couplers in the group holding a cover on an assembly is of the locking type, the cover will not come off without placing a magnet above the one locking fastener, and then applying the pressing load to unlock all of the couplers. This feature adds to the security aspect of these fasteners as the service personnel must know how to orient, or have an orientation dock, that orients the device properly, and also know where to place the magnet to unlock.

Figures 7, 8:
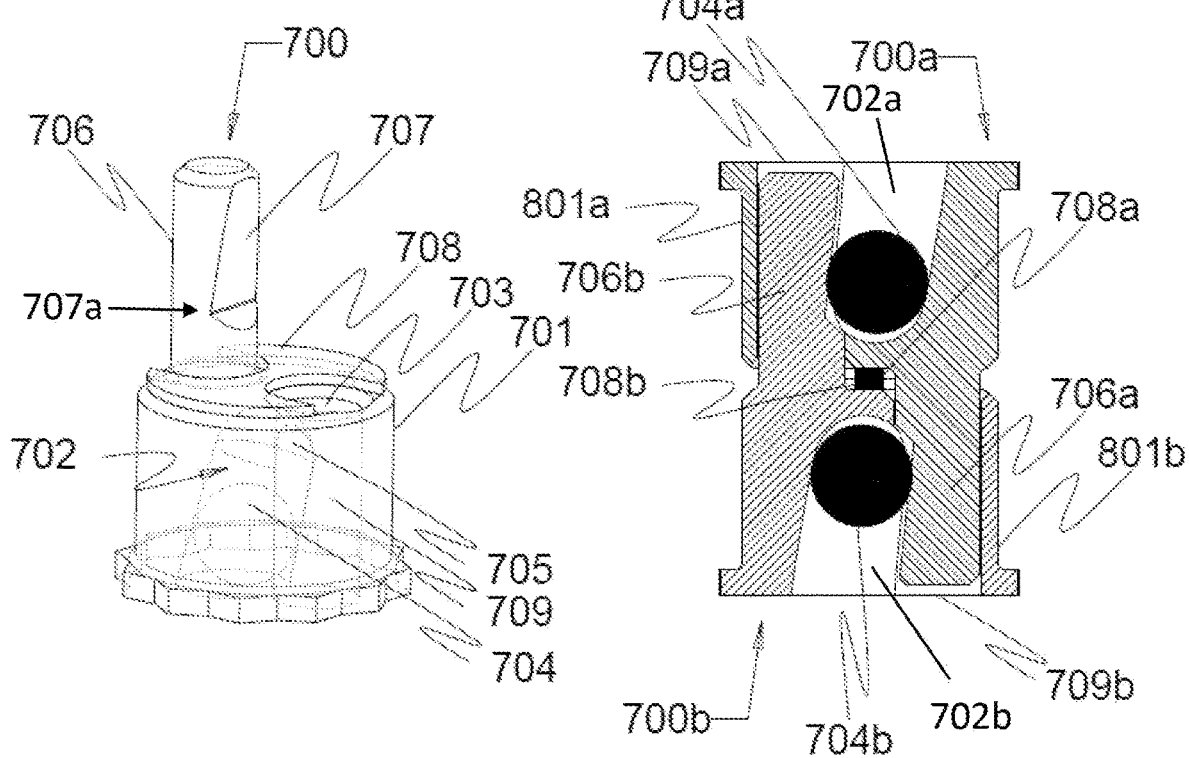
FIG. 7 shows a perspective view of an embodiment of one half of a gravity-orientation coupler.
FIG. 8 shows a cross sectional view of an embodiment of the gravity-orientation coupler.
Figure 9A:
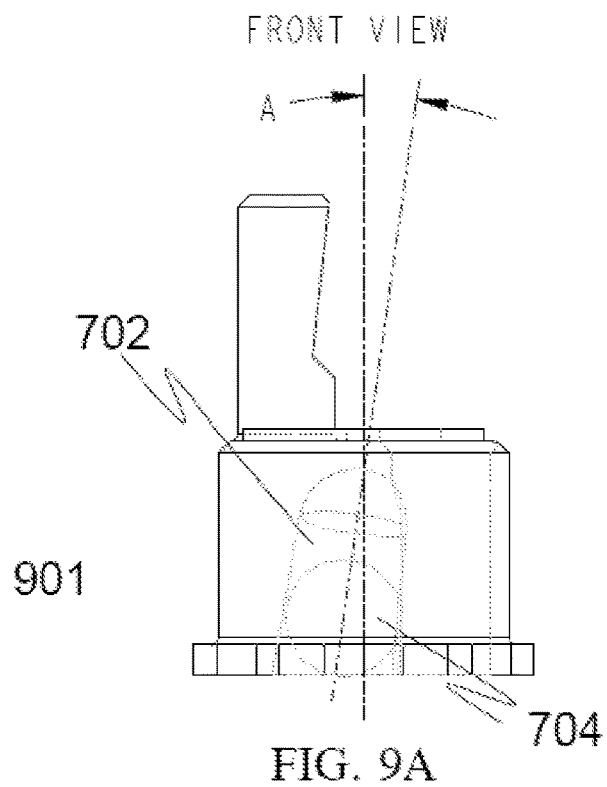
FIG. 9A shows a perspective view of an embodiment of the gravity-orientation coupler and angles for the respective chambers.
Figure 9B:
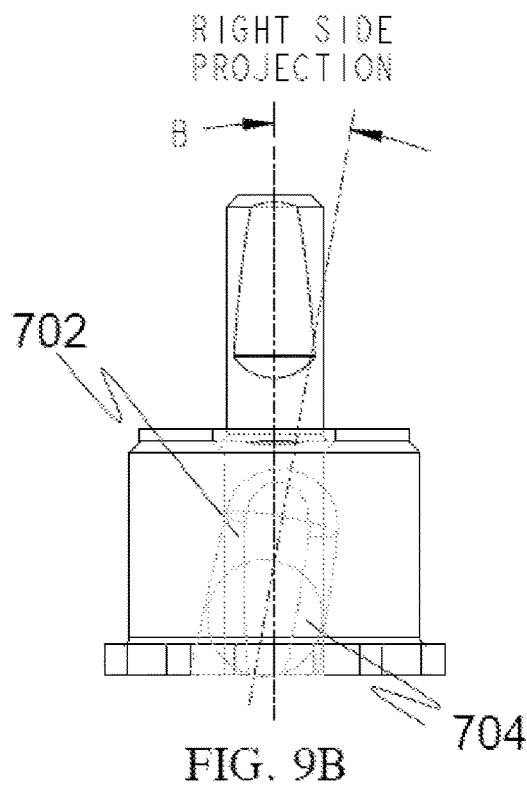
FIG. 9B shows a perspective view of an embodiment of the gravity-orientation coupler and angles for the respective chambers.
Figure 9C:
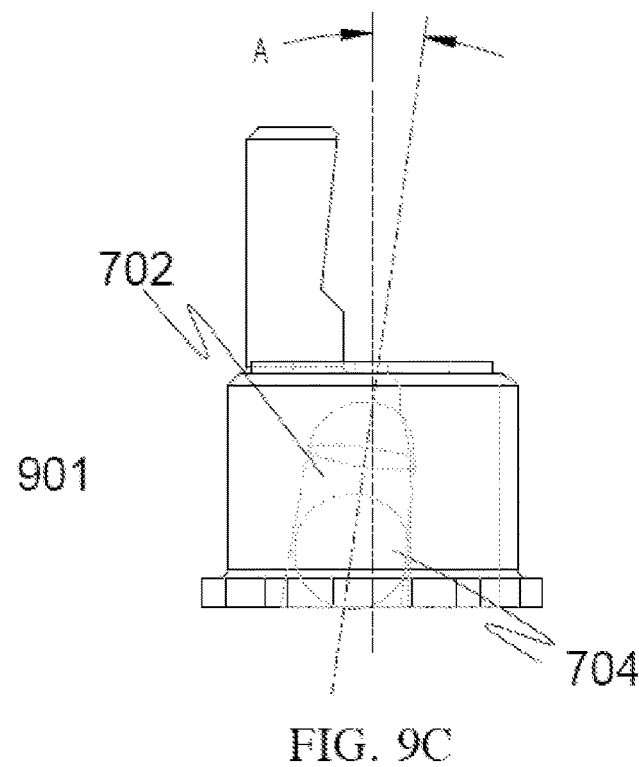
FIG. 9C shows a perspective view of an embodiment of the gravity-orientation coupler and angles for the respective chambers.
Figure 9D:
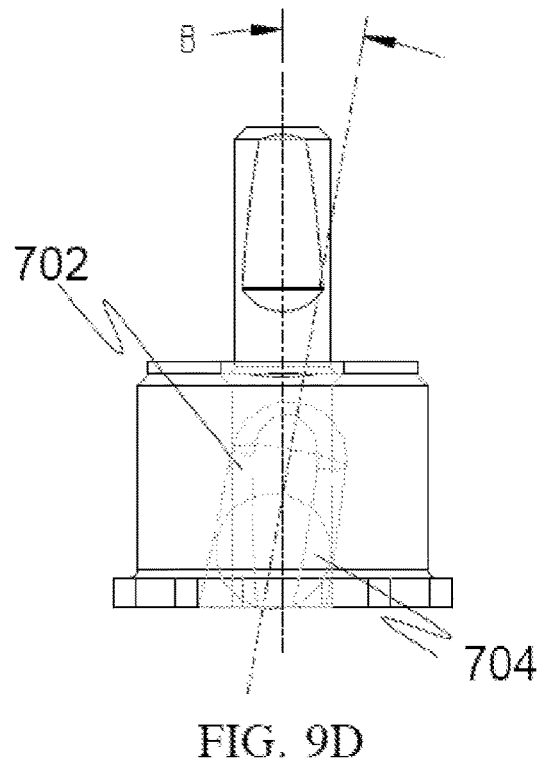
FIG. 9D shows a perspective view of an embodiment of the gravity-orientation coupler and angles for the respective chambers.
Figure 10A:
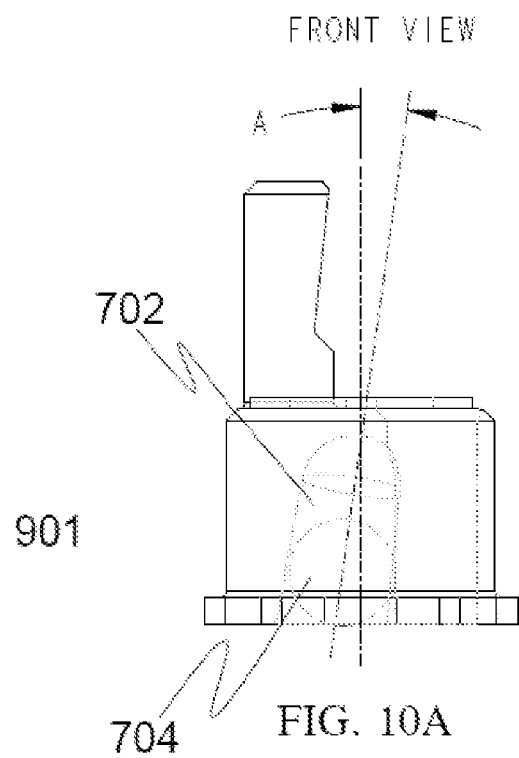
FIG. 10A shows a perspective view of an embodiment of the gravity-orientation coupler and angles for the respective chambers.
Figure 10B:
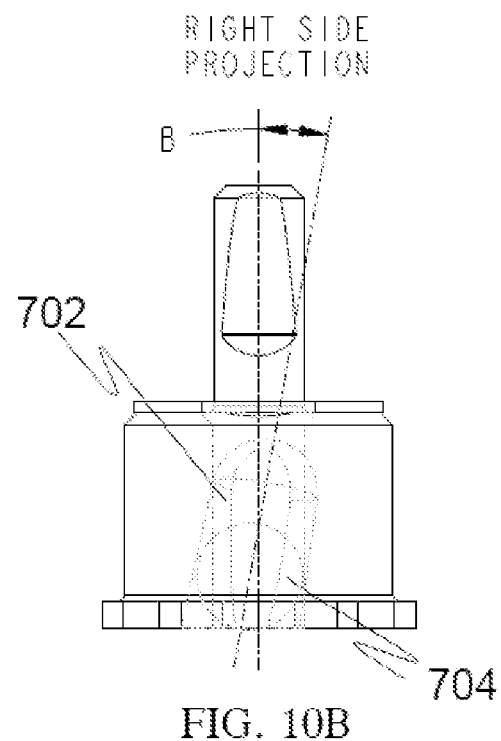
FIG. 10B shows a perspective view of an embodiment of the gravity-orientation coupler and angles for the respective chambers.
Figure 10C:
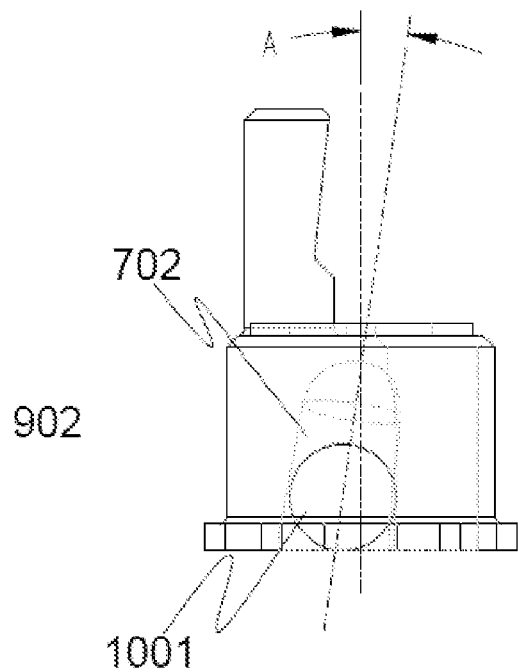
FIG. 10C shows a perspective view of an embodiment of the gravity-orientation coupler and angles for the respective chambers.
Figure 10D:
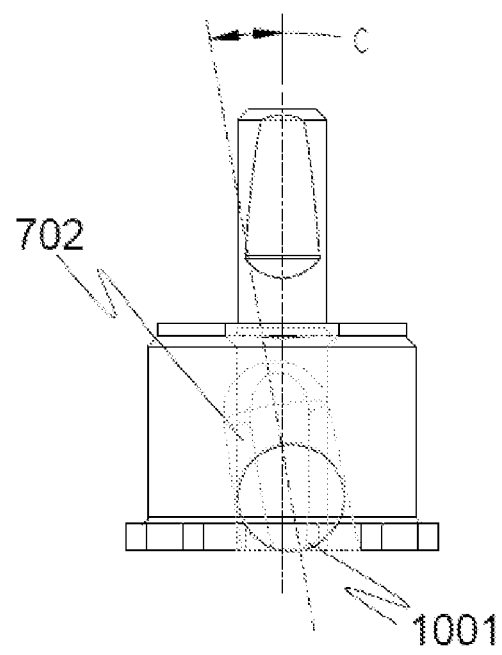
FIG. 10D shows a perspective view of an embodiment of the gravity-orientation coupler and angles for the respective chambers.

FIG. 7 shows a perspective view of an embodiment of one half of a gravity-orientation coupler. In one embodiment gravity-orientation coupler is comprised of two halves. FIG. 7 shows one half 700 of the coupler. Each coupler half 700 is configured to fit together face to face. In this embodiment each coupler half 700 is comprised of a housing 701. In one embodiment the housing 701 is round, in other embodiments as shown throughout the housing is of various shapes. The housing 701 has a ball chamber 702 located therein. The ball chamber 702 houses a ball 704 therein. The ball chamber 702 is configured such that the ball 704 will be able to move therein. In different embodiments the ball chamber has different angles with which it is oriented. These will be described in FIG. 9 and FIG. 10.

The ball chamber 702 has an opening 705 located therethrough. The opening connected the ball chamber 702 to a tongue chamber 709. The tongue chamber 709 includes an opening 703 at one end. In many embodiments the opening 703 is located adjacent to the opening 705 between the ball chamber 702 and the tongue chamber 709. In all embodiments the opening 705 allows for the ball 704 to at least partially protrude therefrom entering the tongue chamber 709.

Each housing 700 has a tongue 706 which protrudes therefrom. In one embodiment the tongue 706 is cylindrical in shape. In other embodiments as described throughout the tongue 706 is of different shapes. The tongue 706 is configured to be received by the opening 703 of the tongue chamber 709. At least one surface 707 of the tongue 706 is configured to be contacted by the ball 704 of the other coupler half. In one embodiment the surface 707 is flat. Further, in this embodiment, there is a cutaway in the tongue 706. This cutaway creates the flat surface 707 but also adds and angle 707a to the flat surface 707. In this embodiment the flat surface 707 will angle into the tongue 706.

Further, in some embodiments a pliable material 708 is placed along a surface of each coupler half. In one embodiment the pliable material 708 is a rubber material. In one embodiment pliable material 708 will function as a gasket. Further functions of the pliable material 708 will be discussed below.

FIG. 8 shows a cross sectional view of an embodiment of the gravity-orientation coupler. In FIG. 8 there are two coupler halves 700a and 700b secured together. Each tongue 706a, 706b has been inserted into the tongue chamber 709a, 709b of the opposing coupler housing 700a, 700b, respectively. When coupled together ball 704a, 704b retreat into the respective ball chamber 702a, 702b allowing the tongue 706a, 706b to enter the respective tongue chamber 709a, 709b. Once the tongues 706a, 706b are inserted at least one ball 704a, 704b, is able to move into a securing position. This position is one where when the coupler halves 700a, 700b are pulled apart the respective ball 704a, 704b will apply pressure to the opposing tongue 706a, 706b. In some embodiments for this pressure to be applied the ball 704a, 704b, will protrude from the opening in the coupler half 700a, 700b. The pressure will force each tongue 706a, 706b into the sidewall 801a, 801b of each housing 700a, 700b. This will prevent the coupler from being able to be pulled apart.

In some embodiments as discussed above a pliable material 708a, 708b is added to a surface of each coupler half 700a, 700b. In one embodiment the pliable material 708a, 708b is compressed when the coupler halves 700a, 700b are secured together. The pliable material 708a, 708b will thus apply a pressure to each coupler half 700a, 700b as its elastic pressure attempts to return the pliable material 708a, 708b to the original size and shape. The pliable material 708a, 708b will enhance the couplers by ensuring that the balls 704a, 704b stay locked in place due to the pressures applied to the coupler halves 700a, 700b.

Referring now to FIG. 9A-FIG. 9D there is shown perspective views of an embodiment of the gravity-orientation coupler and angles for the respective chambers. In one embodiment the ball chamber 702 includes two respective angles A, B. Angle A is defined as the angle between the ball chamber 702 and the tongue chamber where the angle is created by distancing the bottoms of both chambers from each other. Angle A will ensure that the ball can roll completely into the ball chamber 702 and away from the tongue chamber.

Angle B is defined as the angle of the ball chamber 702 created by rotating the ball chamber 702 left or right of the tongue chamber in the right-side view. In this embodiment angle B ensures that the gravity-oriented coupler is only released when in one orientation. When two coupler halves 901 each using the same, or similar, angle B, are placed together the at least one ball of the coupler halves will always remain engaged except for in one orientation.

Referring now to FIG. 10A-FIG. 10D there is shown perspective views of an embodiment of the gravity-orientation coupler and angles for the respective chambers. When using the embodiment of FIG. 9 it is possible, however unlikely, for an accidental separation to occur. A solution is to have one coupler half 901 containing a ball chamber 702 with angle A and angle B and a second couple half 902 containing a ball chamber 702 with angle A and an angle C. Angle C is defined as the angle of the ball chamber 702 created by rotating the ball chamber 702 left or right of the tongue chamber in the right-side view. Angle C is further defined as being of a different degree than that of angle B. In some embodiments, Angle C is further defined as being the inverse of angle B or thereabout.

When angle C is the inverse of angle B a magnet is required to separate the coupler. In this embodiment at least one ball 704, 1001 of the coupler halves will always be engaged. To ensure separation is possible one of the balls 1001 placed within the coupler halves is made from a ferromagnetic material. This will allow for the ball 1001 to be moved from an engaged position using a magnet. In order to unlock the coupler and separate the halves the device will need to be specifically oriented such that the non-magnetic ball 704 is released. A magnet is then used to pull the ferromagnetic ball 1001 from the locked position to an unlocked position. The coupler halves may then be separated.

Figures 11, 12:
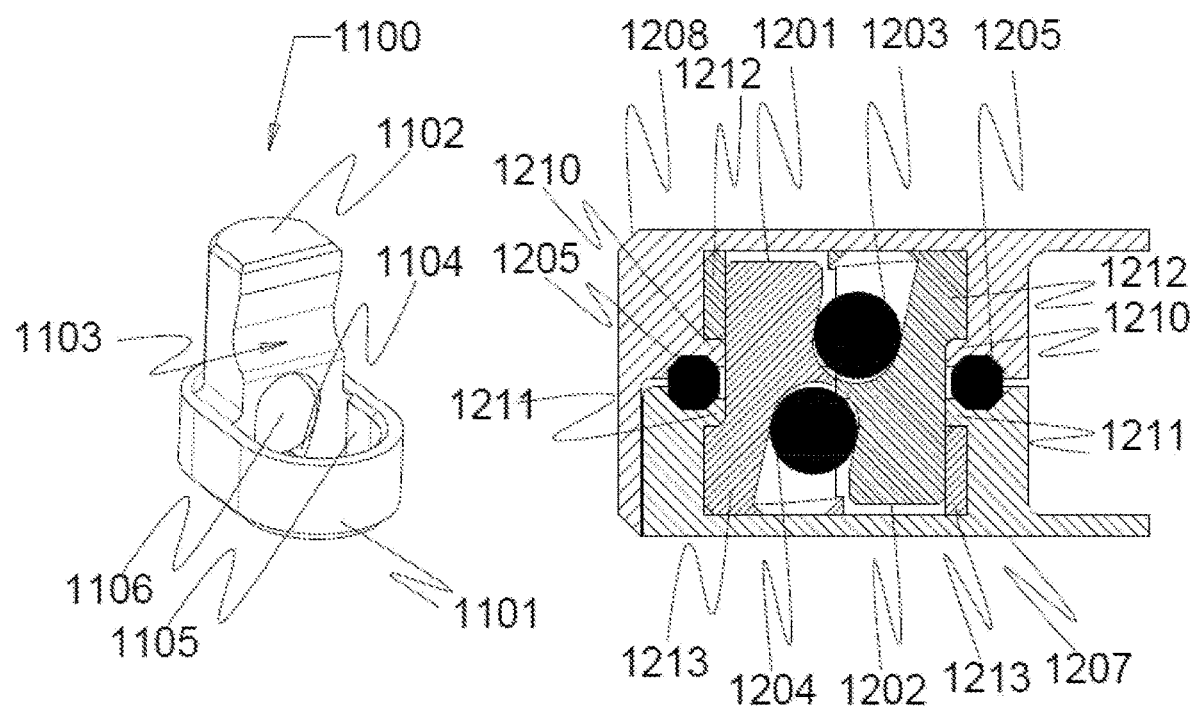
FIG. 11 shows a perspective view of an embodiment of one half of the gravity-orientation coupler.
FIG. 12 shows a cross-sectional view of an embodiment of the gravity-orientation coupler.

FIG. 11 shows a perspective view of an embodiment of one half of the gravity-orientation coupler. In one embodiment the gravity-oriented coupler is comprised of two halves. In one embodiment a first half 1100 is comprised of a base 1101. In the shown embodiment the base 1101 is oval shaped, however, other shapes may be used to a similar result. The base 1101 includes a tongue 1102 which protrudes from the base 1101. The tongue 1102 includes an angled section 1103. The angled section 1103 is used as described below to secure the first half 1100 to a second half.

The tongue 1102 includes a ball chamber 1104. The ball chamber 1104 is located in a section of the tongue 1102 which is within the base 1101. A ball 1106 is movably placed within the ball chamber 1104. The ball 1106 will secure the first half 1100 and the second half together as described below. A tongue chamber 1105 is located within the base 1101. The tongue chamber 1105 is adjacent to the ball chamber 1104 and will allow the tongue of the second half to be inserted therein.

In this embodiment the coupler may be manufactured with metal injection molding, or 3D printing. These methods of manufacture can easily produce the non-round shapes throughout, enabling an overall smaller fastener, without compromising the strength of the tongue 1102, which has an enlarged cross section versus a round tongue. The angled area 1103 is still present for the mating with the ball 1106. The corresponding tongue chamber can also be constructed easily. The ball chamber 1104, has enough space to provide travel for the ball 1106, to pinch the opposing tongue, as well as evacuate the area to allow disengagement of the coupler halves, when the balls 1106 disengage.

Referring now to FIG. 12, there is shown a cross-sectional view of an embodiment of the gravity-orientation coupler. In many embodiments the couplers are placed within the halves of a housing to hold a device together. In one embodiment a pliable material 1205 is placed adjacent to the coupler 1201, 1202. The pliable material 1205 is biased to return to its original shape. The pliable material 1205 is able to be squished as halves of a device 1207, 1208 are placed together. The coupler halves 1201, 1202 will fit together as the pliable material 1205 is squished. Once the couplers halves 1201, 1202 are fitted together the balls 1203, 1204 of each coupler half 1201, 1202 will secure the coupler together. The pliable material 1205 being biased to its original shape will apply a pressure to the device halves 1207, 1208. The created pressure will ensure a constant pressure is applied to the coupler halves 1201, 1202 and thus ensure they remain secured until released.

In one embodiment the coupler halves 1201, 1202 are secured within the device halves 1207, 1208 using the metal of the device halves 1201, 1202. Extra metal 1210, 1211, is pushed over the ledge 1212, 1213, to retain the coupler halves 1201, 1202, in their respective mounting holes. In displacing the metal 1210, 1211 to install the coupling halves a cavity is left around each coupling half. In this cavity the pliable material 1205 may be placed as shown and described above.

Figure 13:
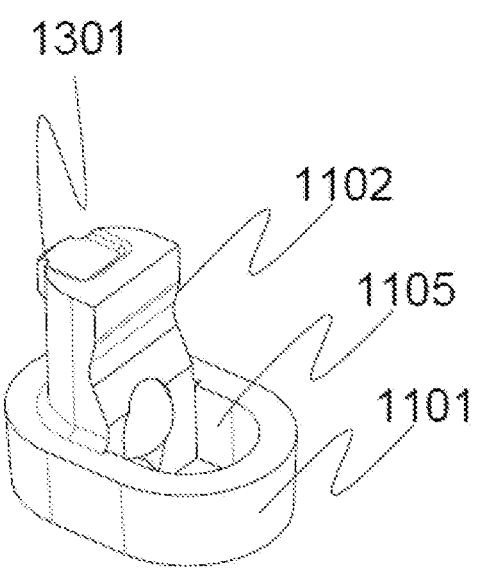
FIG. 13 shows a perspective view of an embodiment of one half of the gravity-orientation coupler.
Figure 14:
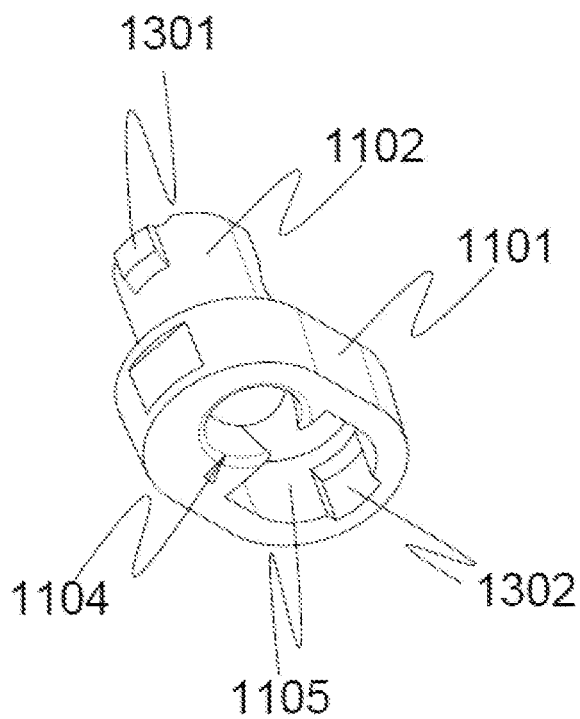
FIG. 14 shows a perspective view of an embodiment of one half of the gravity-orientation coupler.

Referring now to FIG. 13 and FIG. 14, there is shown perspective views of an embodiment of one half of the gravity-orientation coupler. In a further embodiment the coupler of FIG. 11 and FIG. 12 further include a protrusion 1301 along the tongue 1102. In one embodiment the protrusion 1301 is located opposite the opening 1105 in the base 1101. In one embodiment one side of the protrusion 1301 is angled.

The base 1101 includes a channel 1302. In one embodiment the channel 1302 is located within a sidewall of the opening 1105. In one embodiment the channel 1302 is located opposite the chamber 1104. In one embodiment the channel 1302 is angled on the inboard side. Once inserted into the opposite coupler half the protrusion 1301 will engage with the channel 1302, and the opposing angles of protrusion 1301 and channel 1302 will be mated.

Figure 15:
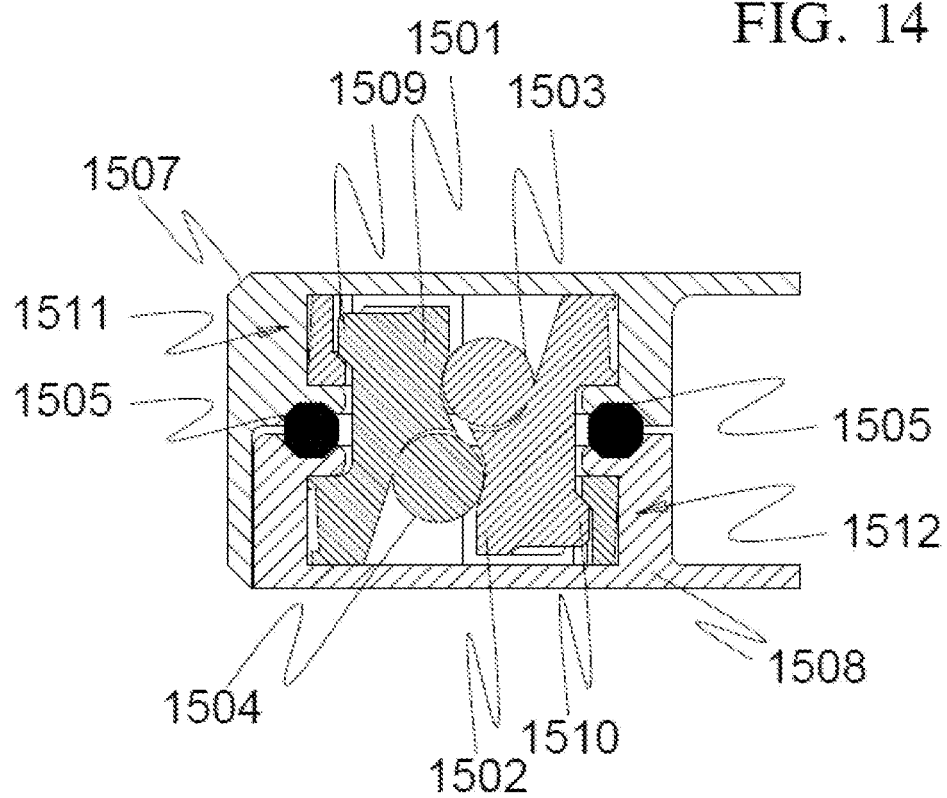
FIG. 15 shows a cross-sectional view of an embodiment of the gravity-orientation coupler.

Referring now to FIG. 15, there is shown a cross-sectional view of an embodiment of the gravity-orientation coupler. In many embodiments the couplers are placed within the halves of a housing to hold a device together. In another embodiment similar to FIG. 12 a pliable material 1505 is placed adjacent to the coupler 1501, 1502. The pliable material 1505 is biased to return to its original shape. The pliable material 1505 is able to be compressed as halves of a device 1507, 1508 are placed together. The coupler halves 1501, 1502 will fit together as the pliable material 1505 is compressed. Once the couplers halves 1501, 1502 are fitted together the balls 1503, 1504 of each coupler half 1501, 1502 will secure the coupler together. The pliable material 1505 being biased to its original shape will apply a pressure to the device halves 1507, 1508. The pressure from the pliable material 1505 is applied to the coupler halves 1501, 1502 and ensures they remain secured until released. In this embodiment when the coupler halves 1501, 1502 are assembled the protrusions 1509, 1510 are also secured within the channels 1511 and 1512.

The pliable material 1505 is compressed when the device halves of 1507 and 1508 are assembled. Orienting the assembly properly and compressing the material 1505 during assembly allows the balls 1503 and 1504 to drop deeply, near to the end of their respective ball chambers. The balls 1503 and 1504, being engaged are themselves compressed when the pliable material 1505 pushes back onto the device housings 1507 and 1508. The compressed balls 1503 and 1504, now acting like springs, push back onto the coupler halves 1501 and 1502. Given that there is clearance around the tongues of each coupler half, and the engagement of the angle on protrusions 1509 and 1510, with the channels 1511 and 1512, reaction forces at the angled interfaces produce horizontal and vertical force components. The horizontal components are absorbed by the device cases 1507 and 1508. The vertical components of the reaction forces on the angled faces are directed down from coupler half 1501 and upward from coupler half 1502. These vertical reaction forces effectively create a clamp load between the device cases 1507 and 1508, which increases as the pull apart load also increases. An additional function of the engaged protrusions 1509 and 1510 with channels 1511 and 1512, is that the wall of the housing in which the channels 1511 and 1512 are created, and the protrusions 1509 and 1510, include a shear pressure load. When forcibly pulled to separate, this increases the design failure load of the coupled pair.

Referring now to FIG. 16A-FIG. 16C, there is shown various views of an embodiment of the gravity-orientation coupler. In one embodiment the coupler halves 1602, 1603 are secured within the housing of a device. In this embodiment the couplers are secured by applying pressure to the housing. The application of force to the respective device housings transfers to the oval floating displacers 1601 and will flow metal from the device housings into a volume above the ledges of the coupler halves 1602, 1603. This will then hold the coupler halves 1602, 1603 within the device housing, which can now be separated by orientation.

In one embodiment a displacer 1601 is used. This displacer 1601 is harder than the malleable metal of a casing which the coupler is secured into. In one embodiment there is one displacer 1601 for each coupler half 1602, 1603. Once implanted into the device half the ball 1604 is permanently located within the ball chamber. Here there is shown that the outward facing surface of the displacer is larger than that of the inward facing surface of the displacer. This will ensure that greater pressure is created at the lesser area side of the displacer as the displacers are pressed into the device half, as discussed in FIG. 17A and FIG. 17B.

In one embodiment the displacer 1601 may have an undercut 1606. This will allow for a malleable metal to be flowed into this undercut securing the displacer 1601 in place.

Figure 17A:
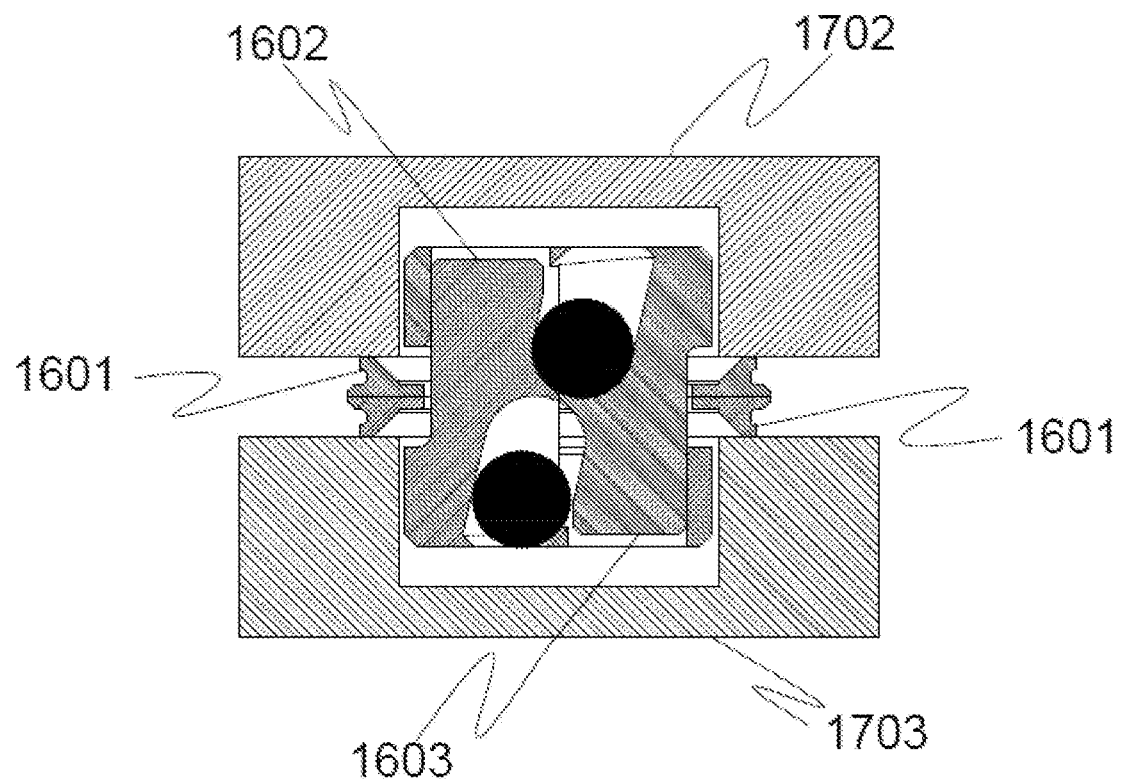
FIG. 17A shows a cross-sectional view of an embodiment of the gravity-orientation coupler.
Figure 17B:
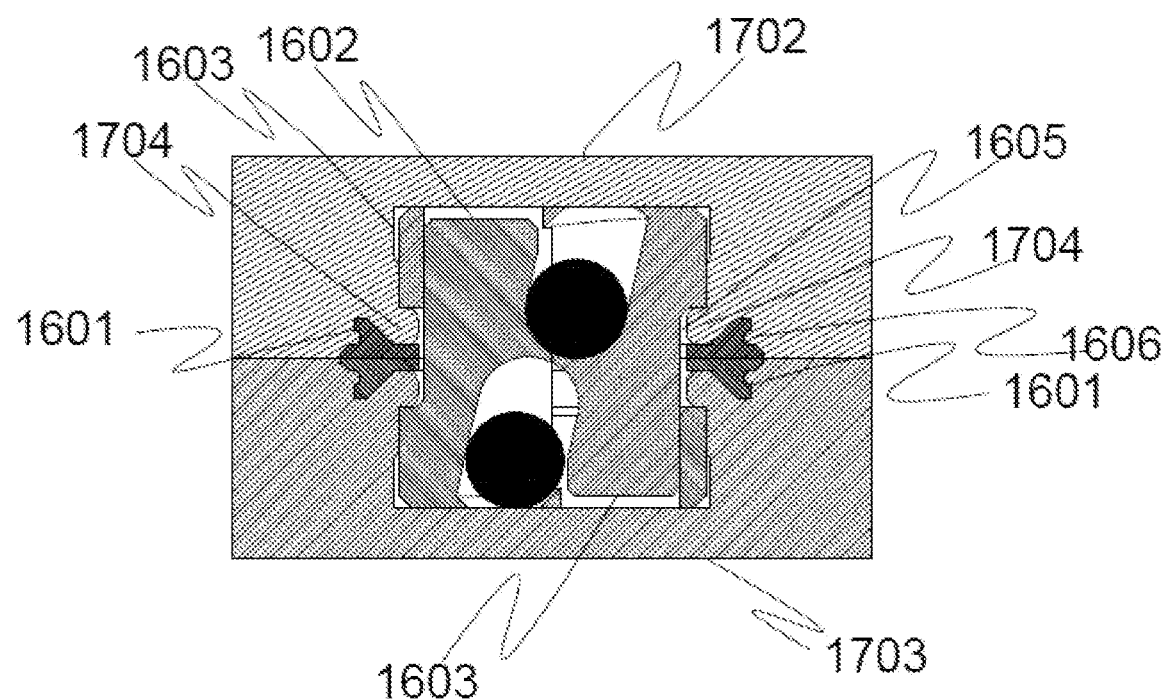
FIG. 17B shows a cross-sectional view of an embodiment of the gravity-orientation coupler.

Referring now to FIG. 17A and FIG. 17B, there is shown cross-sectional views of an embodiment of the gravity-orientation coupler. In one embodiment there is at least one displacer 1601. In the shown embodiment the at least one displacer 1601 is located between device halves 1702, 1703. Further, in this embodiment the device halves 1702, 1703 have a precut location for the coupler halves 1602, 1603 to be seeded. When the device halves 1702, 1703 are pressed together the displacers 1601 is are pressed into the malleable metal 1704 of the device halves 1702, 1703.

When the e metal 1704 is-yielded, it flows into the undercut 1606 and over ledge 1605. The metal 1704 will fill in open volume and press against the coupler halves 1602, 1603. This can be seen in FIG. 17B. Once pressed in place the coupler halves 1602, 1603 are secured within the device. As demonstrated this process is conducted simultaneously as the device halves 1702, 1703 are secured together.

Further, in different embodiment the coupler halves will have different ledges, surface areas/volumes or undercuts to allow for the metal 1704 to be pressed against and into the surface. In the shown embodiment the surface area is a curvature which will create a gap 1605 between the coupler half 1602 and the displacer 1601. This gap 1605 will fill with the malleable metal securing the coupler half 1602 in place.

Figures 18, 19:
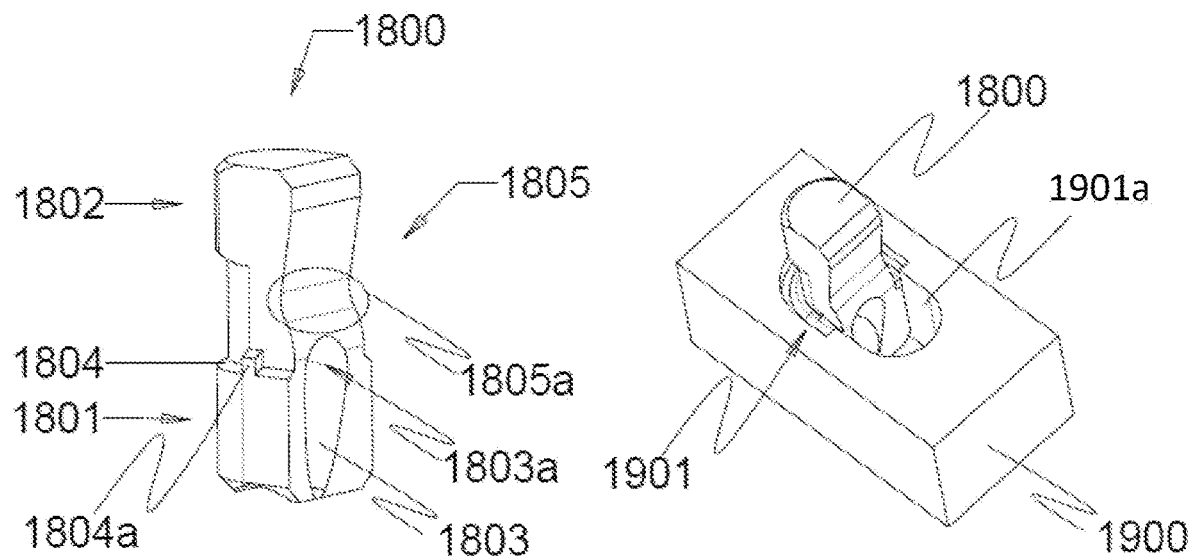
FIG. 18 shows a perspective view of an embodiment of one half of the gravity-orientation coupler.
FIG. 19 shows a perspective view of an embodiment of one half of the gravity-orientation coupler.

Referring now to FIG. 18, there is shown a perspective view of an embodiment of one half of the gravity-orientation coupler. In one embodiment the coupler half 1800 does not include a housing. In this embodiment the coupler half 1800 has a first end 1801 and a second end 1802. A chamber 1803 is located within the first end 1801. The chamber 1803 has an opening 1803a along one side of the coupler half 1800. The chamber 1803 will have a ball movably secured therein. The coupler half 1800 is shaped such that one of the sidewalls 1805 includes a bend 1805a. The bend 1805a will ensure a strong connection when secure to a second coupler half. In one embodiment the sidewall 1805 with the bend 1805a is on the same side of the coupler half 1800 as the opening 1803a of the chamber 1803.

In one embodiment the coupler half 1800 will include a ledge 1804. In one embodiment the ledge 1804 is a protrusion extending outward from the coupler half 1800. In another embodiment the ledge 1804 is created by an indent located above the ledge 1804. In yet another embodiment the ledge 1804 has at least one tooth 1804a. The tooth 1804a will prevent the coupler half 1800 from moving linearly within the oval hole-when secured within a housing as described below.

Referring now to FIG. 19, there is shown a perspective view of an embodiment of one half of the gravity-orientation coupler. In the embodiment of FIG. 19 the housing 1900 of the coupler half 1800 is separate from the coupler half 1800. In one embodiment the housing 1900 is built into the item to be coupled together. In another embodiment the housing 1900 is a separate entity entirely. In any embodiment the housing has an opening 1901. The opening 1901 allows for the coupler half 1800 to be secured therein. The opening 1901 is large enough that once the coupler half 1800 is placed therein there is still an open portion 1901a. The open portion 1901a is proportioned such that a second coupler half may be secured therein.

Figure 20:
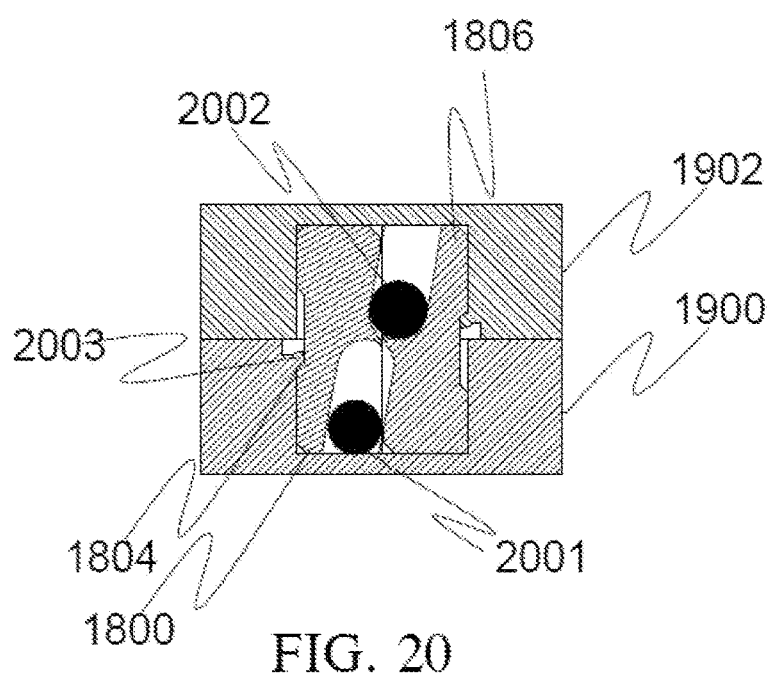
FIG. 20 shows a cross-sectional view of an embodiment of the gravity-orientation coupler.

Referring now to FIG. 20, there is shown a cross-sectional view of an embodiment of the gravity-orientation coupler. In the embodiment of FIG. 18 and FIG. 19 the coupler halves 1800, 1806 secure together the same as many other embodiments described herein. The first coupler half 1800 and the second coupler half 1806 are fitted together. The balls 2001, 2002 of each coupler half 1800, 1806 secure the halves together. Here the separate housings 1900, 1902 function similar to many other embodiments as well.

In one embodiment the coupler halves 1800, 1806 are secured to their respective housings 1900, 1902 via the previously described ledge 1804. In one embodiment a punch may be used to press the housing 1900, 1902. The punch will flow a malleable metal 2003 around the ledge 1804 of the device. This will ensure that the coupler half 1800, 1806 respectively does not become dislodged from the housing allowing separation. Further, in the embodiment the previously mentioned tooth will ensure that the device coupling may not move linearly within the housing. This is because the metal 2003 will be secured around the tooth locking it in place.

Figure 21:
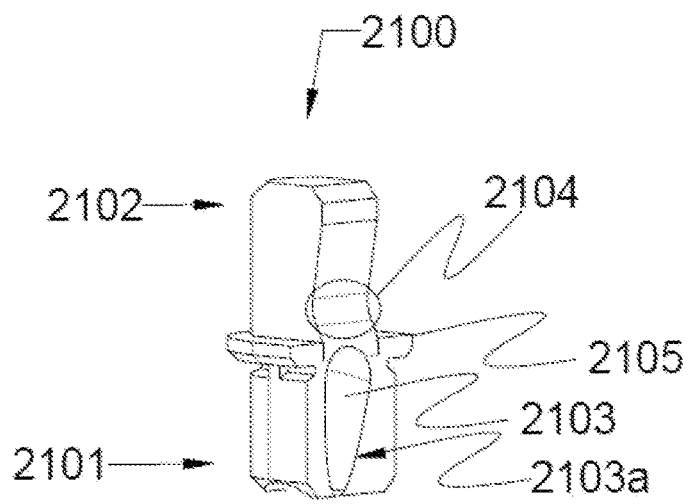
FIG. 21 shows a perspective view of an embodiment of one half of the gravity-orientation coupler.

Referring now to FIG. 21, there is shown a perspective view of an embodiment of one half of the gravity-orientation coupler. In yet another embodiment the gravity-orientation coupler is comprised of a first coupler half 2100. In this embodiment the coupler half 2100 has a first end 2101 and a second end 2102. The coupler half 2100 includes a chamber 2103. In one embodiment the chamber 2103 begins at the first end 2101 and extends toward the second end 2102. The chamber 2103 includes an open portion 2103a.

The coupler half 2100 further includes a bent portion 2104. The bent portion 2104 will ensure a proper connection when the coupler half 2100 is secured with a second coupler half. In a further embodiment the bent portion 2104 and the chamber opening 2103a are located on the same face of the coupler half 2100.

In this embodiment the coupler half 2100 includes a-fixed displacer 2105. In one embodiment the fixed displacer 2105 encircles three (3) faces of the coupler half 2100. In a further embodiment the fixed displacer does not run along the face of the coupler half containing the bent portion 1204 and the opening 2103a to the chamber 2103. This will ensure the coupler half 2100 will still fit flush with a second coupler half.

Figures 22A, 22B:
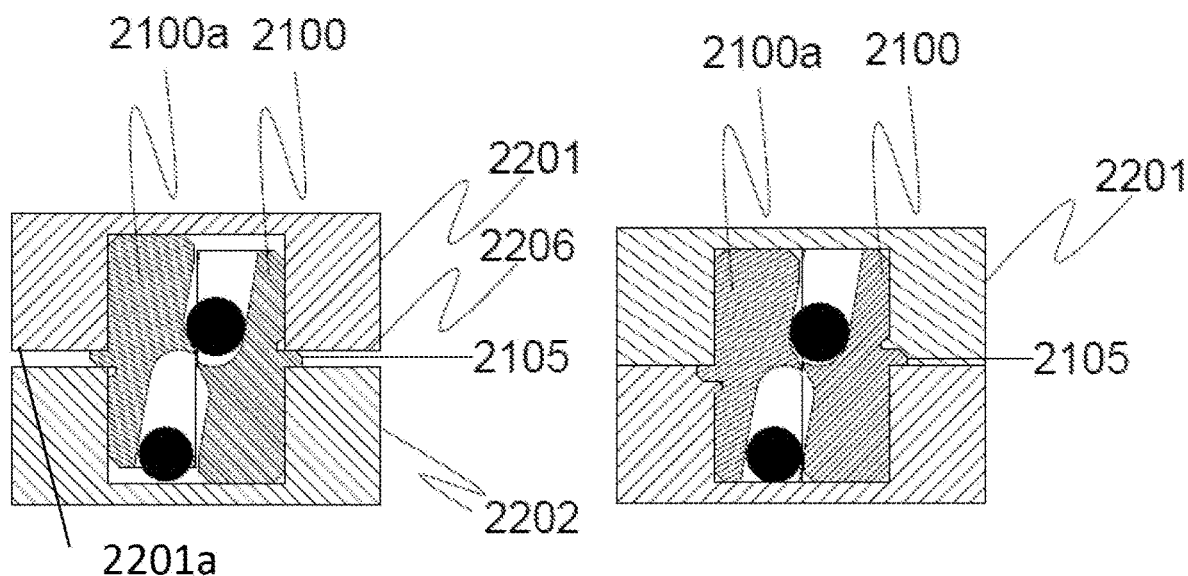
FIG. 22A shows a cross-sectional view of an embodiment of the gravity-orientation coupler.
FIG. 22B shows a cross-sectional view of an embodiment of the gravity-orientation coupler.
Figures 23A, 23B:
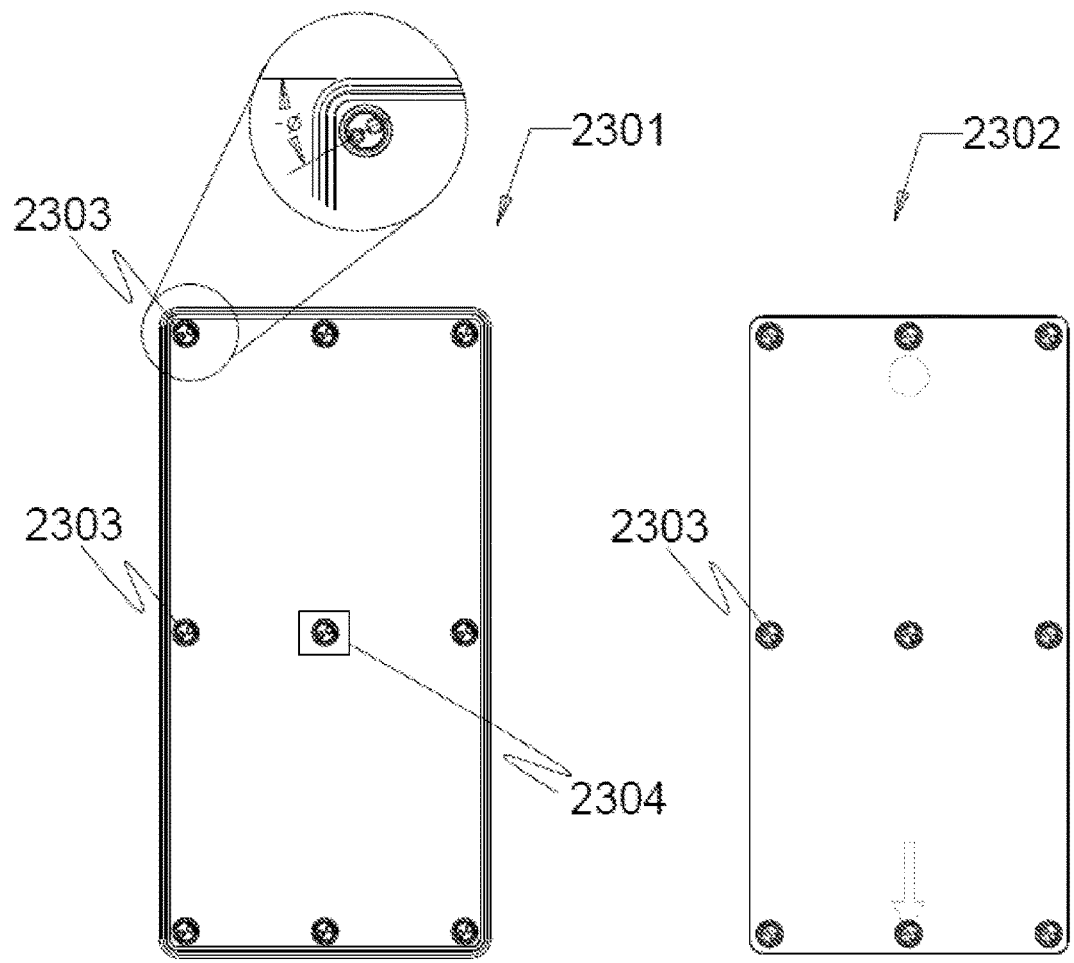
FIG. 23A shows an in-use view of an embodiment of the gravity-orientation coupler.
FIG. 23B shows an in-use view of an embodiment of the gravity-orientation coupler.
Figures 23C, 23D:
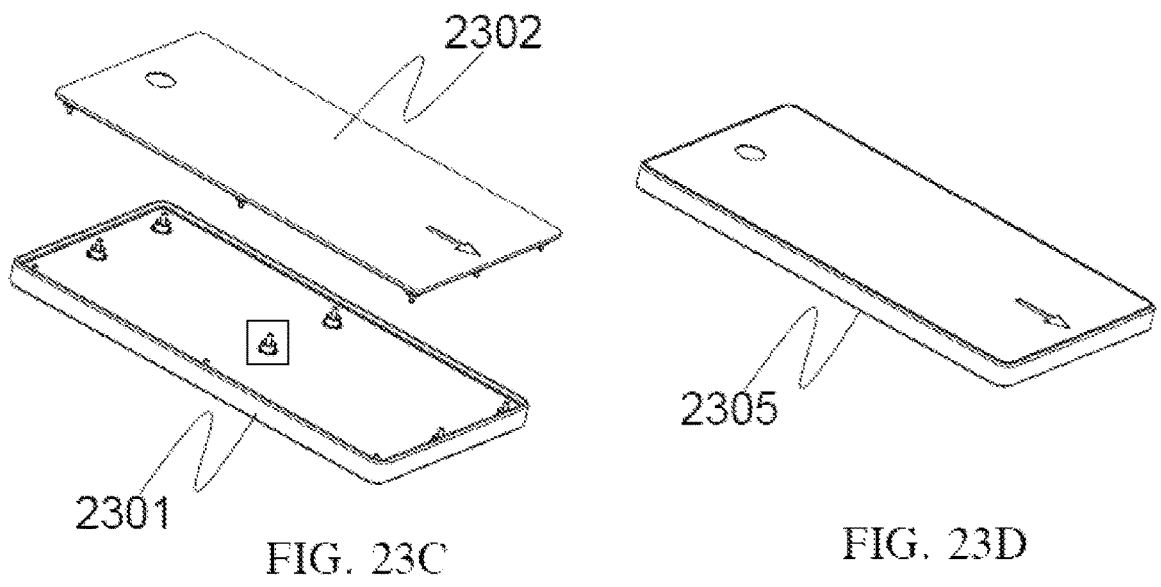
FIG. 23C shows an in-use view of an embodiment of the gravity-orientation coupler.
FIG. 23D shows an in-use view of an embodiment of the gravity-orientation coupler.

Referring now to FIG. 22A and FIG. 22B there is shown a cross-sectional view of an embodiment of the gravity-orientation coupler. The one embodiment the coupler half 2100 is placed within a housing 2201. The fixed displacer 2105 of the coupler half extends outward about the edge 2201a of the housing 2201. When the housings 2201, 2202 are placed together and secured by the coupler halves 2100, 2100a the fixed displacers 2105 will apply pressure to the housing edges of 2201 and 2202. The pressure applied to housing halves 2201 and 2202 by displacers 2105, causes metal from the housing 2201 and 2202 to simultaneously flow into the undercuts and around the tooth of 2100 and 2100a locking them in place.

Referring now to FIG. 23A-FIG. 23D there is shown there is shown in-use views of an embodiment of the gravity-orientation coupler. In one embodiment all of the couplers 2303 in the lower case 2301, and upper case 2302 are installed at an angle of −Θ. One coupler 2304 is of the coupler type described by FIG. 10, where angle "C" is reversed from all of the other couplers in this assembly, and has a ball that is ferromagnetic. All other balls in these assemblies are not attractable by magnetism.

The coupler 2304, located in the center of the lower case 2301, is of the magnetic release type and has both an opposite second angle in the compound angled hole, as well as a ball that is ferromagnetic (that which can be attracted by a magnet). All other couplers 2303 have balls that are not magnetically attractable. Examples of non-ferromagnetic ball materials can be, but not limited to titanium, tungsten, many ceramics, and plastics. Shown is an assembly that is now coupled by gravity orientation couplers and can only be disassembled by placing the device in the proper orientation, with a properly located magnet to disengage all couplers including the part in the center 2304.

When the top casing 2302 is installed on the lower casing 2301 the couplers 2304 all become secured together the device 2305 will be completed. When placed in the proper orientation all couplers 2303 will become unlocked the device 2305 will still be locked together due to coupler 2304. In this orientation coupler 2304 will be partially unlocked. A magnet is then used to fully release coupler 2304. The device 2305 may then be disassembled.

Figures 24A, 24B:
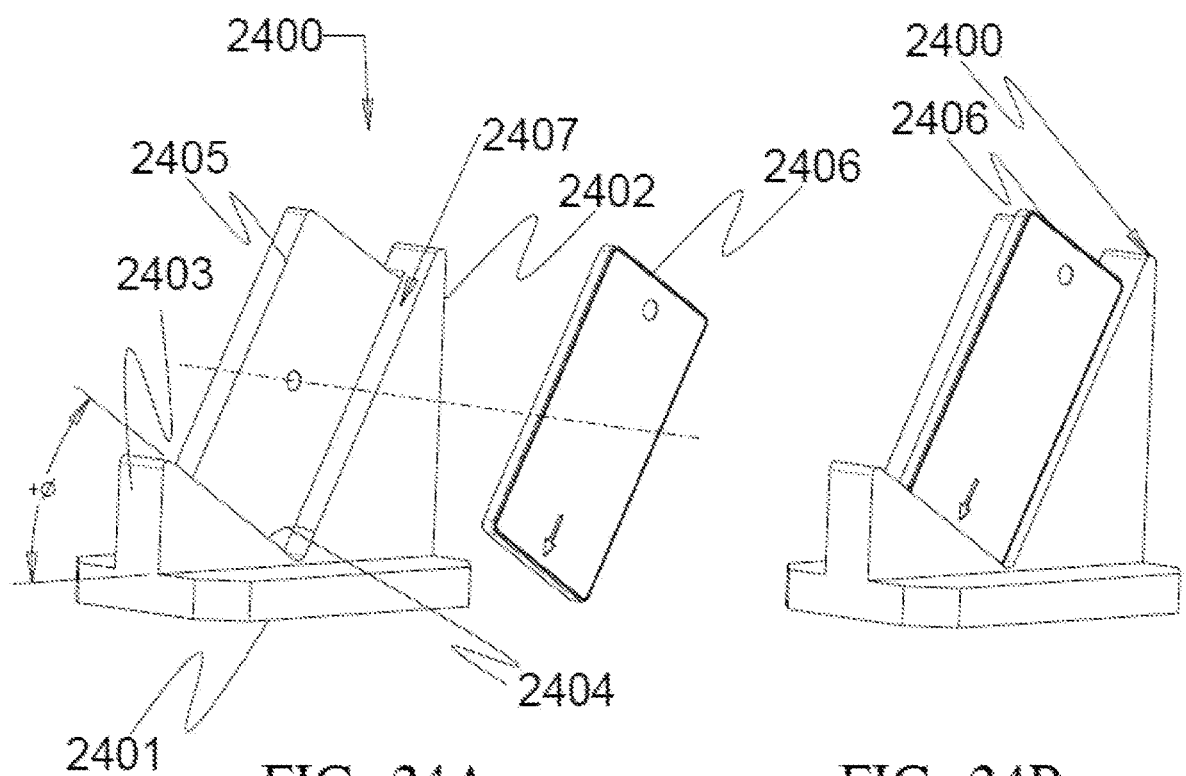
FIG. 24A shows a perspective view of an embodiment of a tool for releasing the gravity-orientation coupler.
FIG. 24B shows a perspective in-use view of an embodiment of the tool for releasing the gravity-orientation coupler.

Referring now to FIG. 24A and FIG. 24B shows perspective views of an embodiment of a tool for releasing the gravity-orientation coupler. As discussed throughout this application a purpose of the gravity-orientation coupler is to only release the coupling when the coupler is placed at a specific angle, or within a specific angle range. Thus, while it is not needed to separate the couplers a coupler separation tool 2400 will enable on to separate the couplers quickly and easily.

Typically, many electronic devices 2406 are comprised of two halves. The halves are then held together via a series of couplers. When the gravity-orientation couplers are used to hold the device halves together, the coupler separation tool 2400 will allow an individual to simply place a device using the coupler thereon and separate the device 2406 without guessing if the device 2406 is at the correct angle for separation.

In one embodiment the coupler separation tool 2400 is comprised of a base 2401. The base 2401 shall be of a length and width adequate to support the device 2406 for which the coupler separation tool 2400 intends to unlock. Therefore, a larger device may require a larger base to support the device and prevent it from tipping. A first raised section 2402 and a second raised section 2403 are secured to the base 2401. The first raised section 2402 and the second raised section 2403 are secured to the base 2401 such that they create an angle 2404. The angle 2404 will be the correct angle to release the desired couplers. In one embodiment the first raise section 2402 and the second raised section 2403 are triangles. This will allow for the correct angle 2404 to be easily created.

A back plate 2405 is secured between the first raised section 2402 and the second raised section 2403. In one embodiment the first raised section 2402 and the second raised section 2403 are thicker than the back plate 2405. The differing thicknesses will create a ledge 2407. The ledge 2407 will allow a device 2406 to be placed thereon. In one embodiment when the device 2406 is properly placed on the ledge 2407 the couplers will release and allow for separation of the device halves.

Figure 25A:
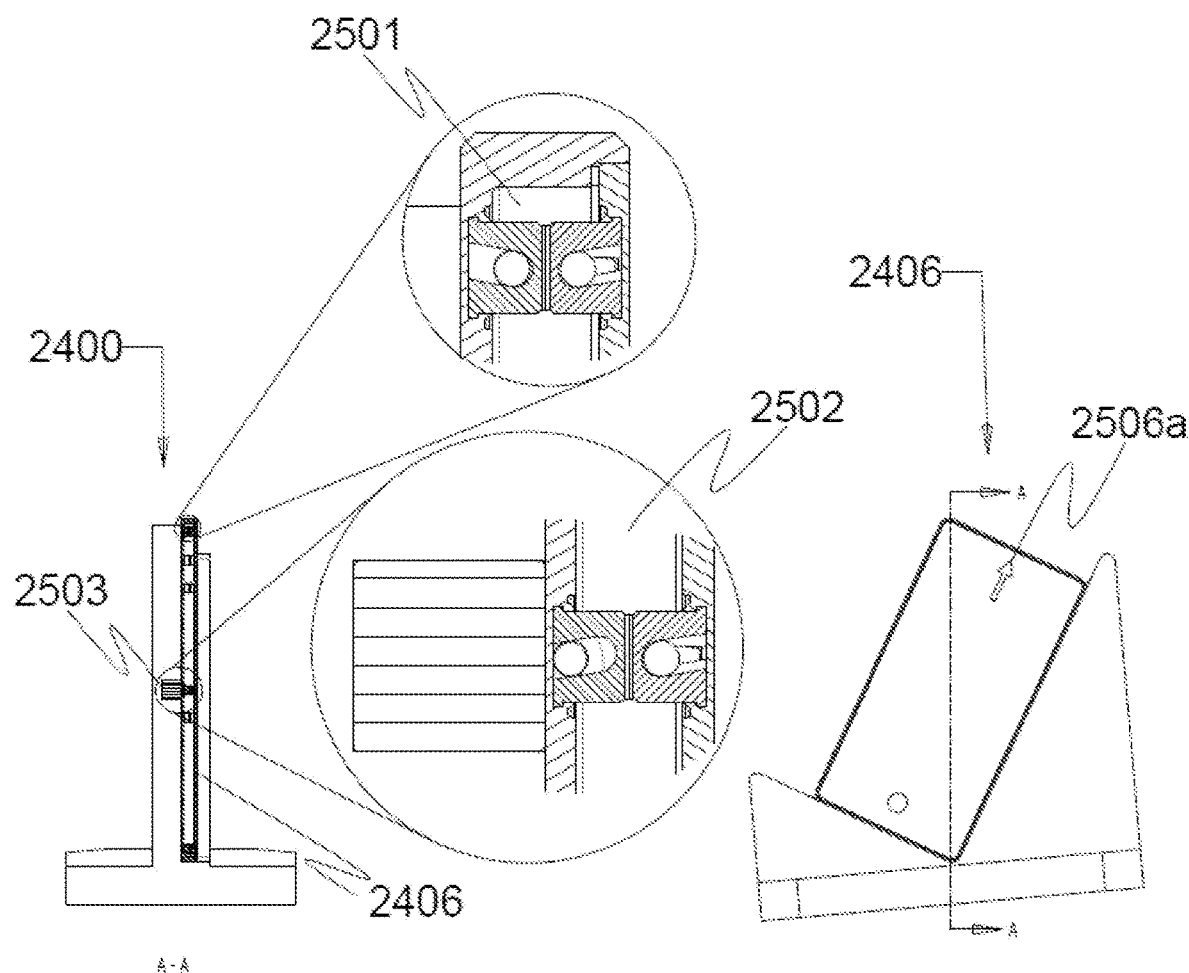
FIG. 25A shows a cross section in-use view of an embodiment of the tool for releasing the gravity-orientation coupler including several enlarged detail callouts.
Figure 25B:
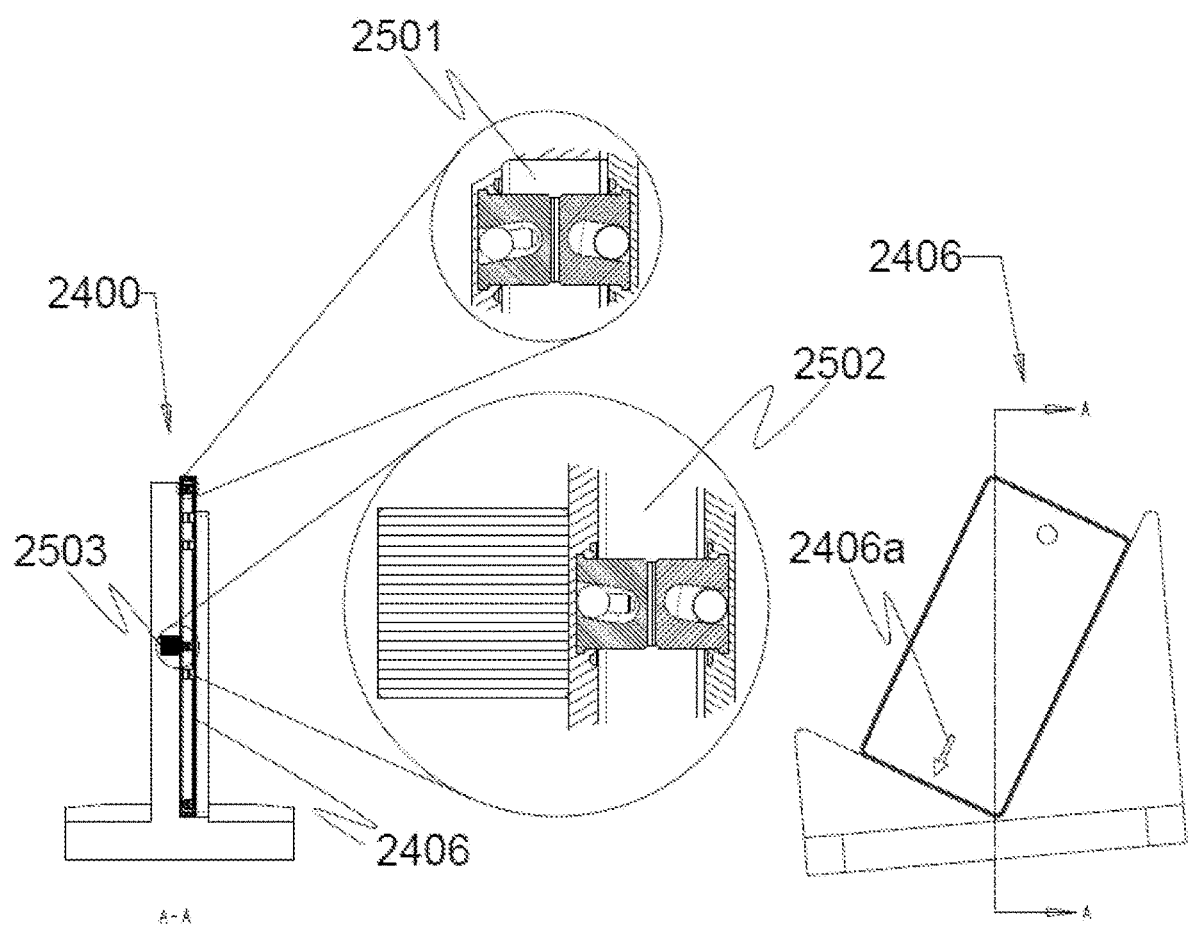
FIG. 25B shows a cross section in-use view of an embodiment of the tool for releasing the gravity-orientation coupler including several enlarged detail callouts.

Referring now to FIG. 25A and FIG. 25B, there is shown perspective in-use views of an embodiment of the tool for releasing the gravity-orientation coupler including several cross-sectional callouts. In these views there is a coupler separation tool 2400 which has a device 2406 placed thereon. The coupler separation tool 2400 has the proper angle that when the device 2406 is properly placed thereon the coupler-2501 will release.

Specifically in FIG. 25A the device 2406 is shown placed on the coupler assembly and separation tool 2400 with the top of the device 2406 pointed upward. In this orientation the device 2400 is positioned for optimal assembly. The callouts show that the couplers 2501, 2502 are in locked positions. It is noted that coupler 2502 is a magnetic type of coupler and that one ball is not locked in place. This is not only due to the magnet 2503 but because of the inverted angle in the coupler half. The magnet 2503 does not have a release effect in this case.

In FIG. 25B the device 2406 is placed on the coupler separation tool 2400 such that the top of the device 2406a is pointed downward. In this position the couplers 2501, 2502 are fully unlocked. Coupler 2501 is unlocked due to the orientation of the device 2406. Coupler 2502 is partially unlocked due to the orientation of the device 2406. The magnet 2503 is pulling the ball of the magnetic coupler 2502 out of the locked position. This will allow for the device to be separated.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A gravity-orientation coupler, the coupler comprising:
a first coupler half and a second coupler half, wherein the coupler halves are shaped to fit flush together;
a housing holding each coupler half;
each coupler half is comprised of a tongue having a ball chamber located within one end of the coupler half, wherein the ball chamber movably houses a ball;
the ball chamber has an opening located at one side;
wherein the opening of each ball chamber has an adjacent tongue chamber;
wherein the tongue chamber is configured to accept the tongue of the opposing coupler half; and
wherein the ball is partially able to protrude from the opening in the ball chamber into the tongue chamber;
the tongue of one coupler half is configured to align with and fit flush against the other coupler half;
the ball and ball chamber are configured such that when the coupler halves are first fitted together, then a separating force is applied to the coupler halves, the ball in at least one of the ball chambers will apply pressure to the tongue of the other coupler half securing the coupler halves together.

2. The gravity-orientation coupler of claim 1, wherein each tongue has at least one flat surface, wherein the ball will contact that flat surface.

3. The gravity-orientation coupler of claim 1, wherein the ball is made of a ferromagnetic material.

4. The gravity-orientation coupler of claim 1, wherein once the coupler halves are secured together the coupler will only release when the coupler is positioned at a predetermined angle.

5. The gravity-orientation coupler of claim 1, wherein the coupler includes at least one gasket placed between the housings of each coupler half.

6. The gravity-orientation coupler of claim 1, further comprising a device, wherein the device is comprised of at least two halves;
at least one coupler half is secured to each half of the device, wherein when the device halves are placed together each of the at least one coupler halves will align securing the device halves together.

7. The gravity-orientation coupler of claim 6, further comprising a displacer securing each coupler half, wherein the displacer has at least one undercut;
the displacer is pressed into a material of the device forcing the material into the undercut securing the coupler half to the device.

8. A gravity-orientation coupler, the coupler comprising:
a first coupler half and a second coupler half, wherein the coupler halves are shaped to fit flush together;
each coupler half is comprised of a tongue having a ball chamber located within one end of the coupler half, wherein the ball chamber movably houses a ball;
wherein each tongue has an angle therein; and
wherein the angle is obtuse and faces toward the ball chamber of the opposite coupler half the ball chamber has an opening located at one side;
the tongue of one coupler half is configured to align with and fit flush against the other coupler half;
the ball and ball chamber are configured such that when the coupler halves are first fitted together, then a separating force is applied to the coupler halves, the ball in at least one of the ball chambers will apply pressure to the tongue of the other coupler half securing the coupler halves together.

9. The gravity-orientation coupler of claim 8, wherein each tongue has at least one flat surface, wherein the ball will contact that flat surface.

10. The gravity-orientation coupler of claim 8, wherein the ball is made of a ferromagnetic material.

11. The gravity-orientation coupler of claim 8, wherein once the coupler halves are secured together the coupler will only release when the coupler is positioned at a predetermined angle.

12. The gravity-orientation coupler of claim 8, wherein the coupler includes at least one gasket placed between the housings of each coupler half.

13. A gravity-orientation coupler, the coupler comprising:
a first coupler half and a second coupler half, wherein the coupler halves are shaped to fit flush together;
each coupler half is comprised of a housing having a tongue protruding therefrom;
wherein each tongue has an angle therein; and
wherein the angle is obtuse and faces toward the ball chamber of the opposite coupler half;
a ball chamber is located within each coupler half, wherein the ball chamber movably houses a ball;
the ball chamber has an opening located at one side;
a tongue chamber is located in the housing adjacent to the ball chamber;
the tongue of one coupler half is configured to align with and fit flush against the other coupler half within the tongue chamber;
the ball and ball chamber are configured such that when the coupler halves are first fitted together, then a separating force is applied to the coupler halves, the ball in at least one of the ball chambers will apply pressure to the tongue of the other coupler half securing the coupler halves together;
a protrusion is located at one end of each tongue;
each housing has a corresponding channel, wherein when the coupler halves are secured together the protrusion will fit within the channel.

14. The gravity-orientation coupler of claim 13, wherein each tongue has at least one flat surface, where in the ball will contact that flat surface.

15. The gravity-orientation coupler of claim 14, wherein the protrusion of each tongue is located opposite of the flat surface.

16. The gravity-orientation coupler of claim 13, wherein the ball is made of a ferromagnetic material.

17. The gravity-orientation coupler of claim 13, wherein once the coupler halves are secured together the coupler will only release when the coupler is positioned at a predetermined angle.

18. The gravity-orientation coupler of claim 13, wherein the coupler includes at least one gasket placed between the housings of each coupler half.

19. The gravity-orientation coupler of claim 13, further comprising a device, wherein the device is comprised of at least two halves;
   at least one coupler half is secured to each half of the device, wherein when the device halves are placed together each of the at least one coupler halves will align securing the device halves together.

* * * * *